US012706652B2

(12) United States Patent
Jeon et al.

(10) Patent No.: US 12,706,652 B2
(45) Date of Patent: Aug. 11, 2026

(54) METHOD FOR PERFORMING FEDERATED LEARNING IN WIRELESS COMMUNICATION SYSTEM, AND APPARATUS THEREFOR

(71) Applicant: LG ELECTRONICS INC., Seoul (KR)

(72) Inventors: Kijun Jeon, Seoul (KR); Sangrim Lee, Seoul (KR); Ikjoo Jung, Seoul (KR); Hojae Lee, Seoul (KR); Taehyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 267 days.

(21) Appl. No.: 18/711,460

(22) PCT Filed: Nov. 7, 2022

(86) PCT No.: PCT/KR2022/017362
§ 371 (c)(1),
(2) Date: May 17, 2024

(87) PCT Pub. No.: WO2023/096214
PCT Pub. Date: Jun. 1, 2023

(65) Prior Publication Data

US 2025/0023609 A1 Jan. 16, 2025

(30) Foreign Application Priority Data

Nov. 25, 2021 (KR) ........................ 10-2021-0164721

(51) Int. Cl.
*H04B 7/06* (2006.01)
*G06N 20/20* (2019.01)
(Continued)

(52) U.S. Cl.
CPC ........... *H04B 7/0626* (2013.01); *G06N 20/20* (2019.01); *H04L 5/0005* (2013.01); *H04L 41/16* (2013.01); *H04W 52/367* (2013.01)

(58) Field of Classification Search
CPC ..... H04B 7/0626; H04L 5/0005; H04L 41/16; H04L 1/00; H04L 1/18; H04W 52/367; G06N 20/20
See application file for complete search history.

(56) References Cited

U.S. PATENT DOCUMENTS

2019/0138934 A1* 5/2019 Prakash ................ G06N 20/00
2021/0117780 A1* 4/2021 Malik ................... G06N 3/044
(Continued)

FOREIGN PATENT DOCUMENTS

CN 112637883 4/2021
KR 10-2010-0122929 11/2010
(Continued)

OTHER PUBLICATIONS

Asad, Muhammad, Ahmed Moustafa, and Takayuki Ito, "Federated learning versus classical machine learning: A convergence comparison." arXiv preprint arXiv:2107.10976 (2021) (Year: 2021).*
(Continued)

*Primary Examiner* — Aaron N Strange
(74) *Attorney, Agent, or Firm* — LEE, HONG, DEGERMAN, KANG & WAIMEY

(57) ABSTRACT

The present specification provides a method by which a terminal performs federated learning with a plurality of terminals in a wireless communication system. More specifically, the method performed by one terminal comprises the steps of: receiving, from a server, a channel state information reference signal (CSI-RS); transmitting, to the server, channel state information (CSI) calculated on the basis of the CSI-RS; receiving, from the server, (i) infor-
(Continued)

mation about a global parameter for the federated learning and (ii) compression state information for determining a weight compression method of the one terminal on the basis of channel state information of each of channels between the server and the plurality of terminals; determining a weight compression scheme based on (i) a difference value between the global parameter and a global parameter received before receiving the global parameter and (ii) the compression state information; and transmitting, to the server, an updated local parameter on the basis of the determined weight compression scheme.

12 Claims, 17 Drawing Sheets

(51) Int. Cl.

| | |
|---|---|
| ***H04L 5/00*** | (2006.01) |
| ***H04L 41/16*** | (2022.01) |
| ***H04W 52/36*** | (2009.01) |

(56) References Cited

U.S. PATENT DOCUMENTS

| | | | | |
|---|---|---|---|---|
| 2021/0365841 | A1* | 11/2021 | Shaloudegi | G06N 3/098 |
| 2022/0343219 | A1* | 10/2022 | Takasaki | G06N 20/00 |
| 2022/0398500 | A1* | 12/2022 | Singhal | G06N 3/098 |
| 2022/0400371 | A1* | 12/2022 | Elshafie | G06N 20/00 |
| 2023/0379949 | A1* | 11/2023 | Kim | H04L 25/02 |
| 2024/0023091 | A1* | 1/2024 | Li | H04W 72/1268 |
| 2024/0322941 | A1* | 9/2024 | Jeon | G06N 3/04 |
| 2025/0016619 | A1* | 1/2025 | Jeon | H04W 28/06 |
| 2025/0023609 | A1* | 1/2025 | Jeon | H04L 1/18 |

FOREIGN PATENT DOCUMENTS

| | | | | |
|---|---|---|---|---|
| WO | WO-2021108796 A2 * | 6/2021 | G06N 3/045 |
| WO | WO-2021221242 A1 * | 11/2021 | G06N 3/098 |
| WO | WO-2022270650 A1 * | 12/2022 | H04L 1/0061 |
| WO | WO-2023090480 A1 * | 5/2023 | H04L 1/00 |

OTHER PUBLICATIONS

Gafni, Tomer, et al. "Federated learning: A signal processing perspective." IEEE Signal Processing Magazine 39.3 (2022): 14-41 (Year: 2022).*

L. U. Khan, W. Saad, Z. Han, E. Hossain and C. S. Hong, "Federated Learning for Internet of Things: Recent Advances, Taxonomy, and Open Challenges," in IEEE Communications Surveys & Tutorials, vol. 23, No. 3, pp. 1759-1799, (2021) (Year: 2021).*

Ren, Jinke, et al. "Scheduling for cellular federated edge learning with importance and channel awareness." IEEE Transactions on Wireless Communications 19.11, pp. 7690-7703, (Year: 2020).*

PCT International Application No. PCT/KR2022/017362, International Search Report dated Feb. 24, 2023, 6 pages.

OPPO, "OPPO views on Rel-18 package," RWS-210041, 3GPP TSG RAN Rel-18 Workshop, Electronic Meeting, Jul. 2021, 37 pages.

Prakash et al., "Coded Computing for Low-Latency Federated Learning over Wireless Edge Networks," arXiv:2011.06223v2, May 2021, 17 pages.

ZTE, "Discussion on channel coding and modulation for new radio interface," R1-162229, 3GPP TSG RAN WG1 #84bis, Apr. 2016, 8 pages.

* cited by examiner

【FIG. 1】
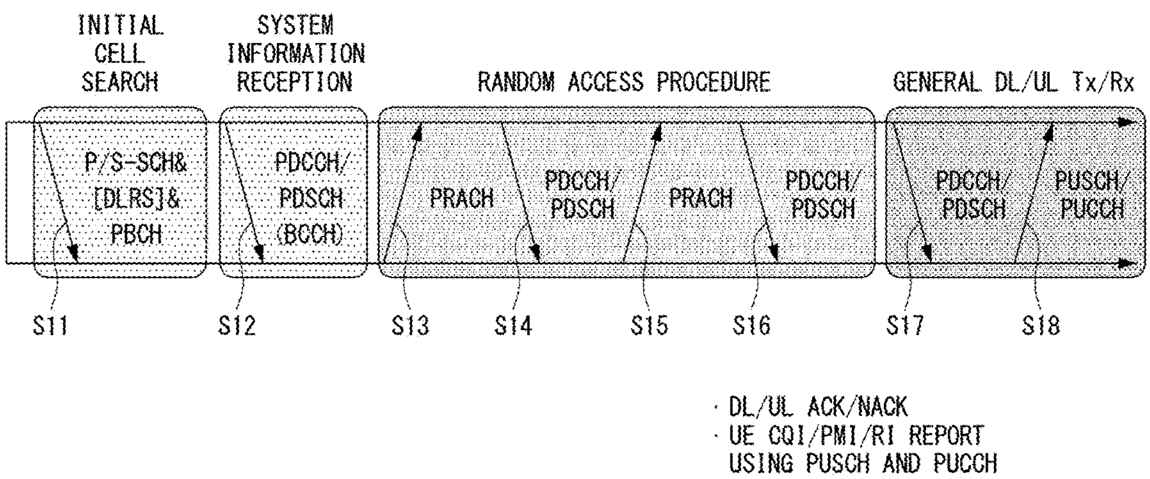

【FIG. 2】
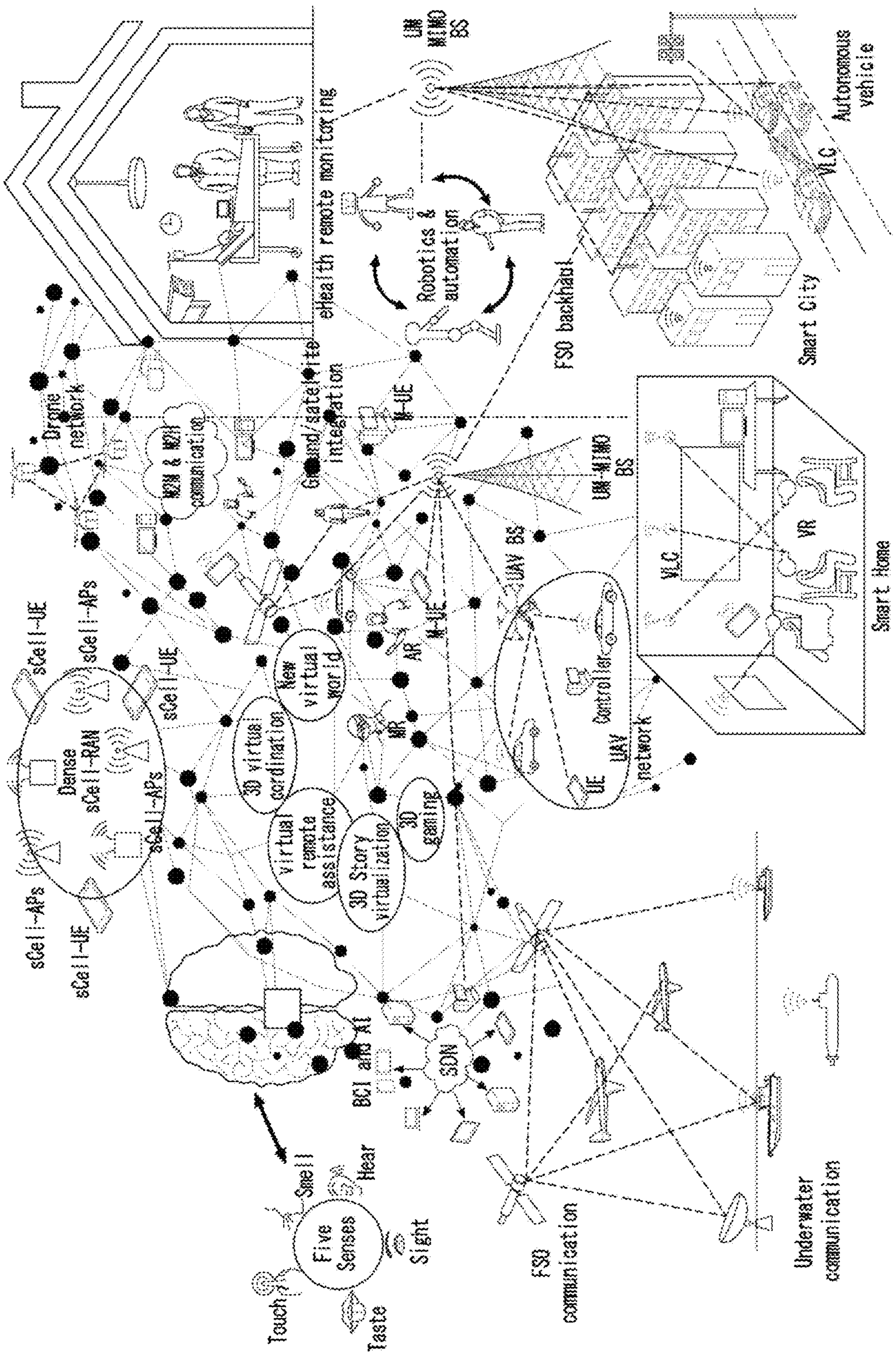

【FIG. 3】
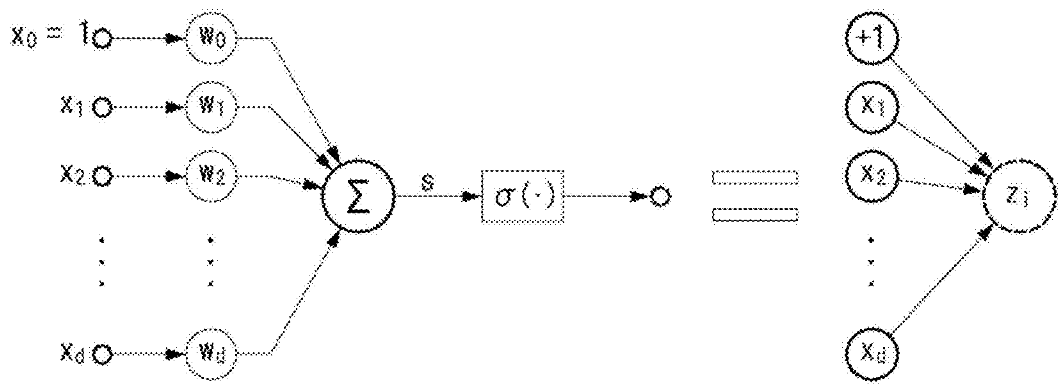
【FIG. 4】
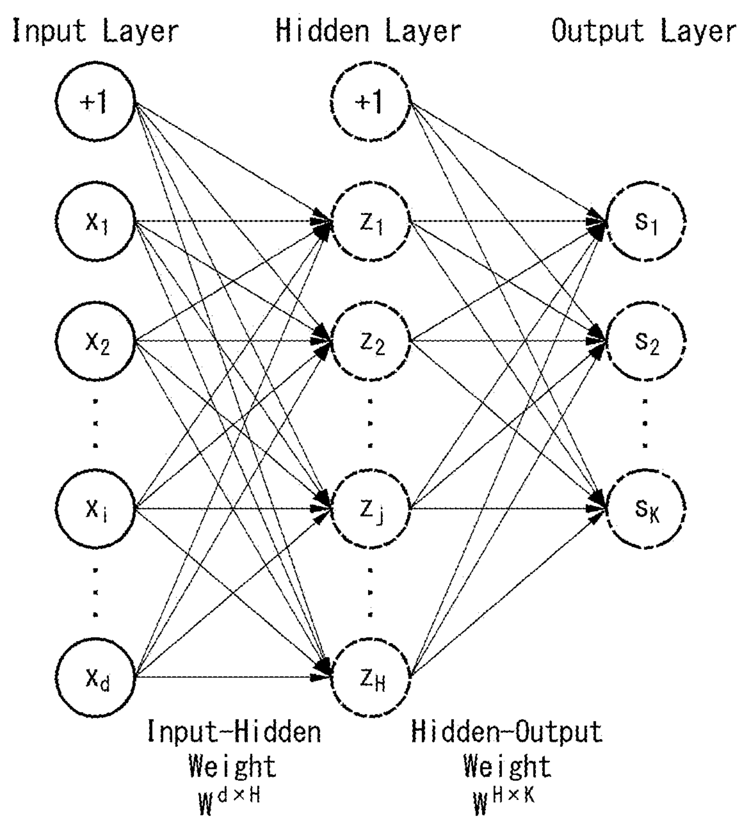

【FIG. 5】
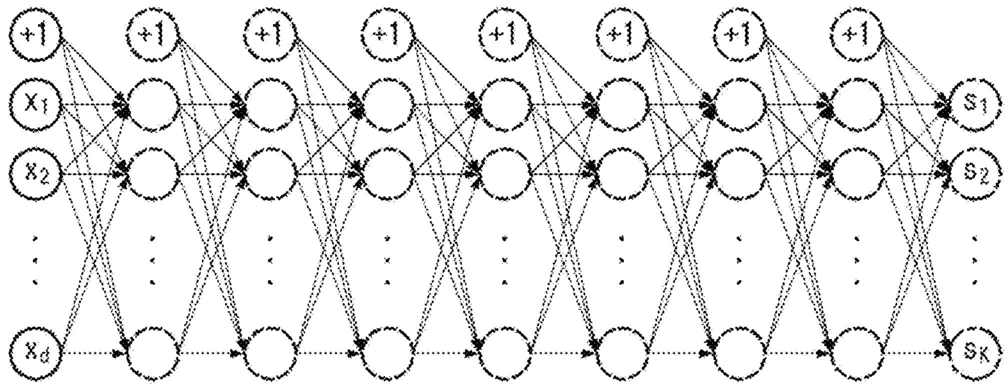
【FIG. 6】
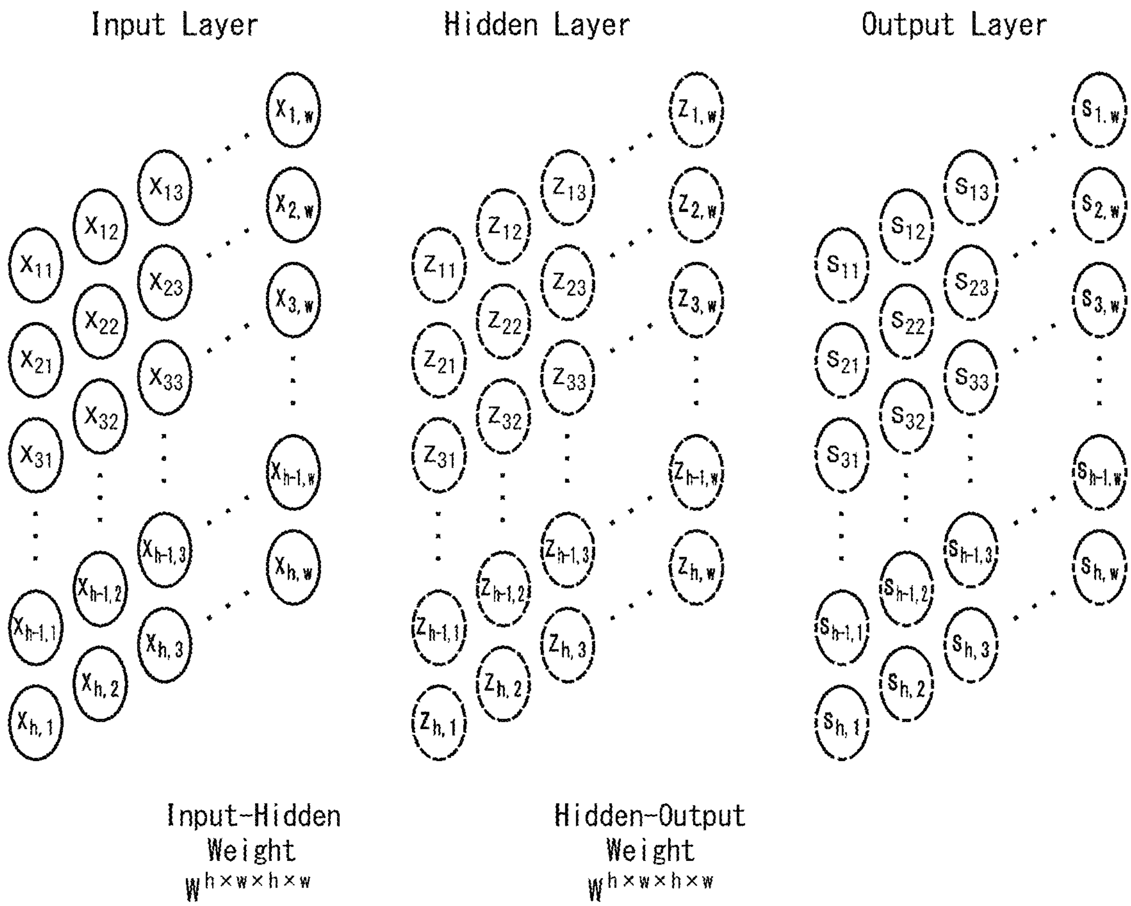

【FIG. 7】
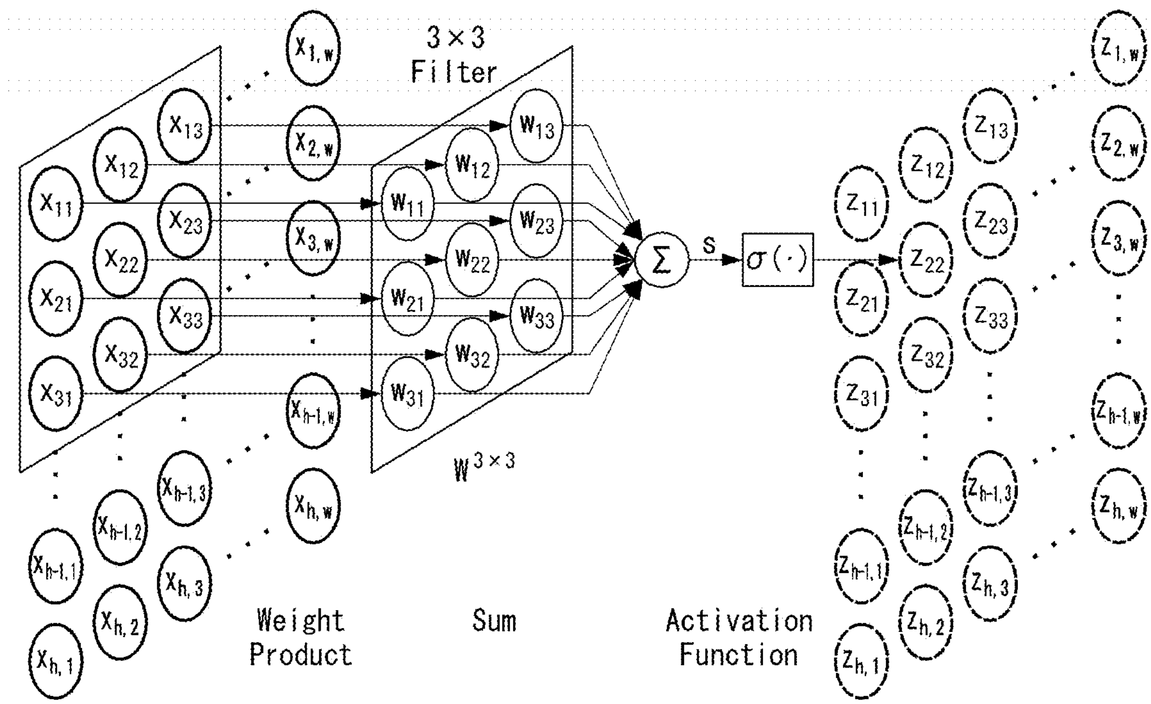
【FIG. 8】
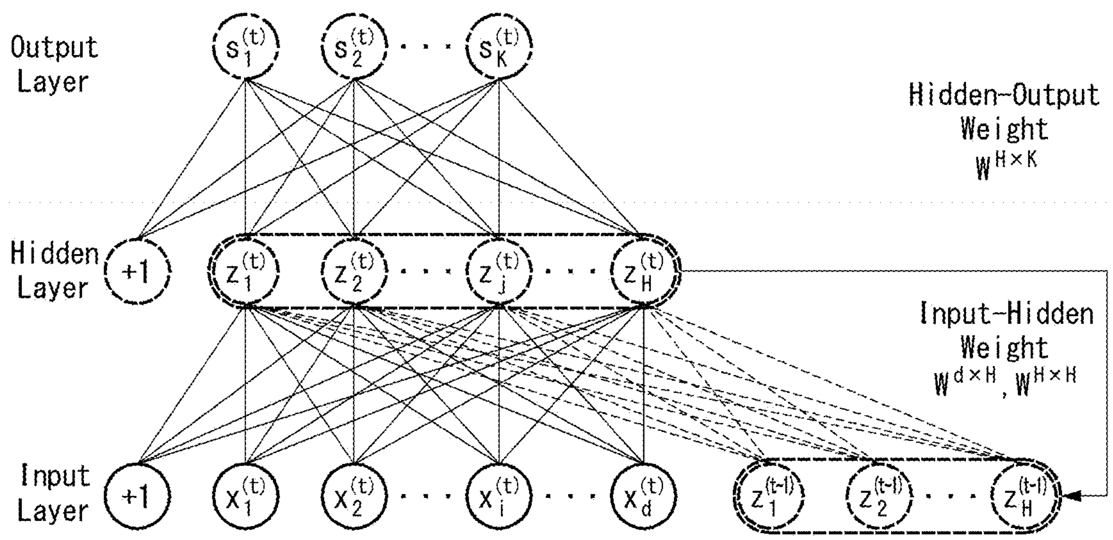

【FIG. 9】
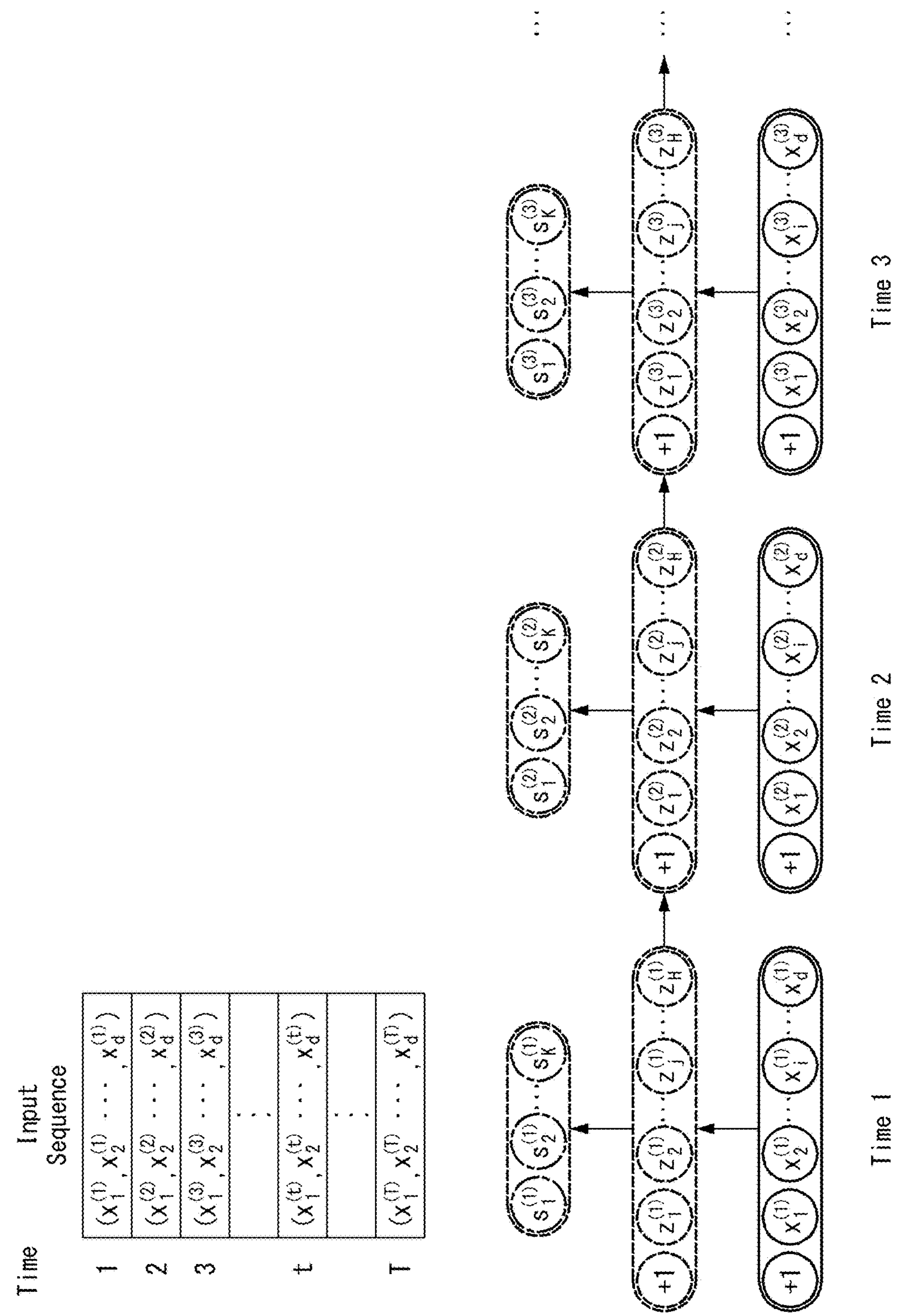

【FIG. 10】
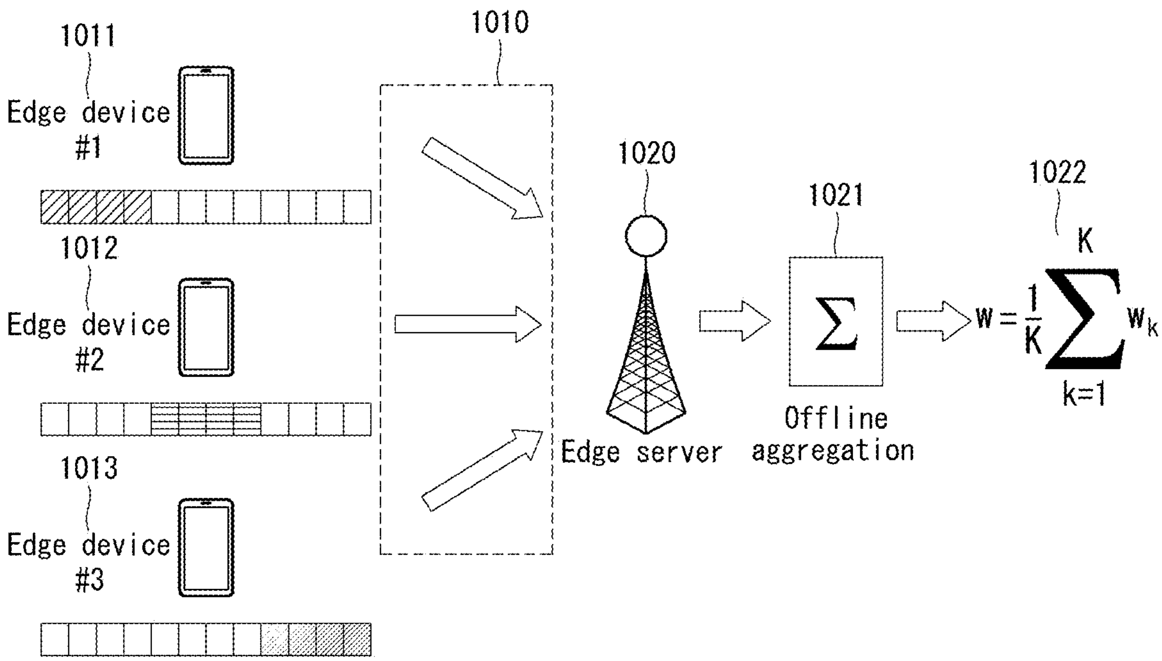
【FIG. 11】
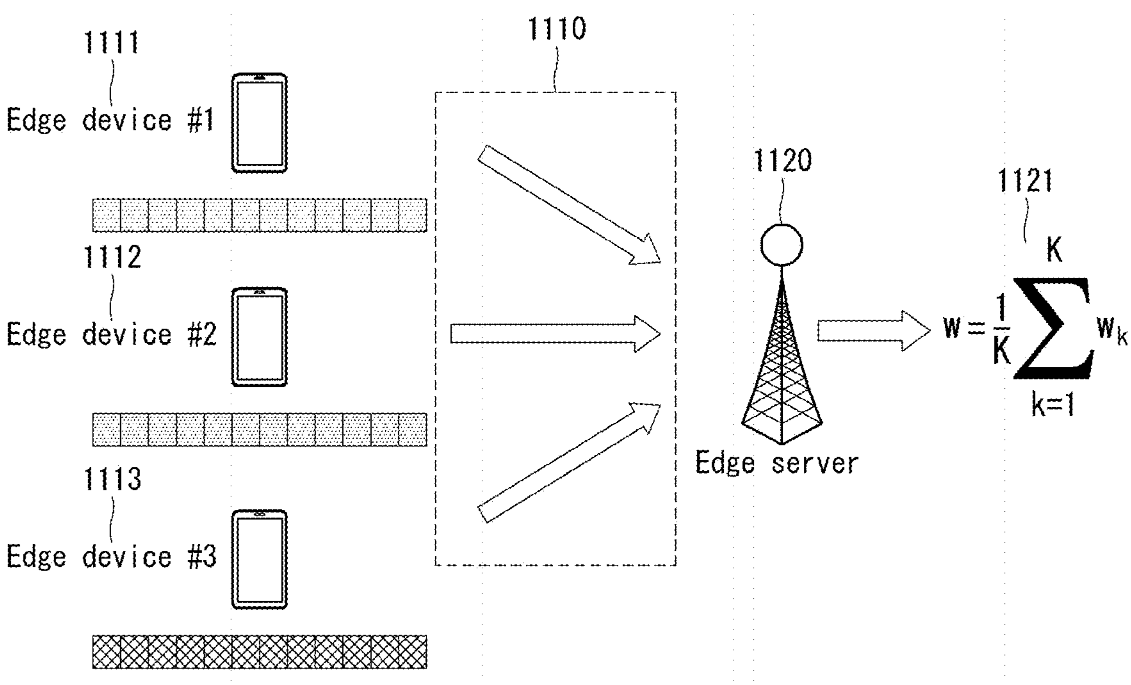

【FIG. 12】
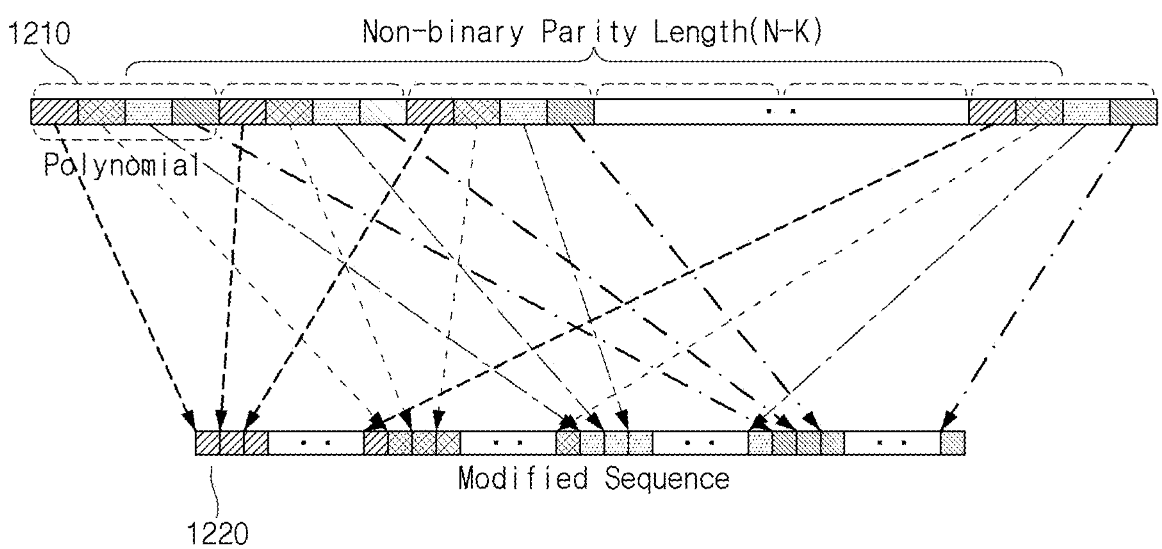

【FIG. 13】
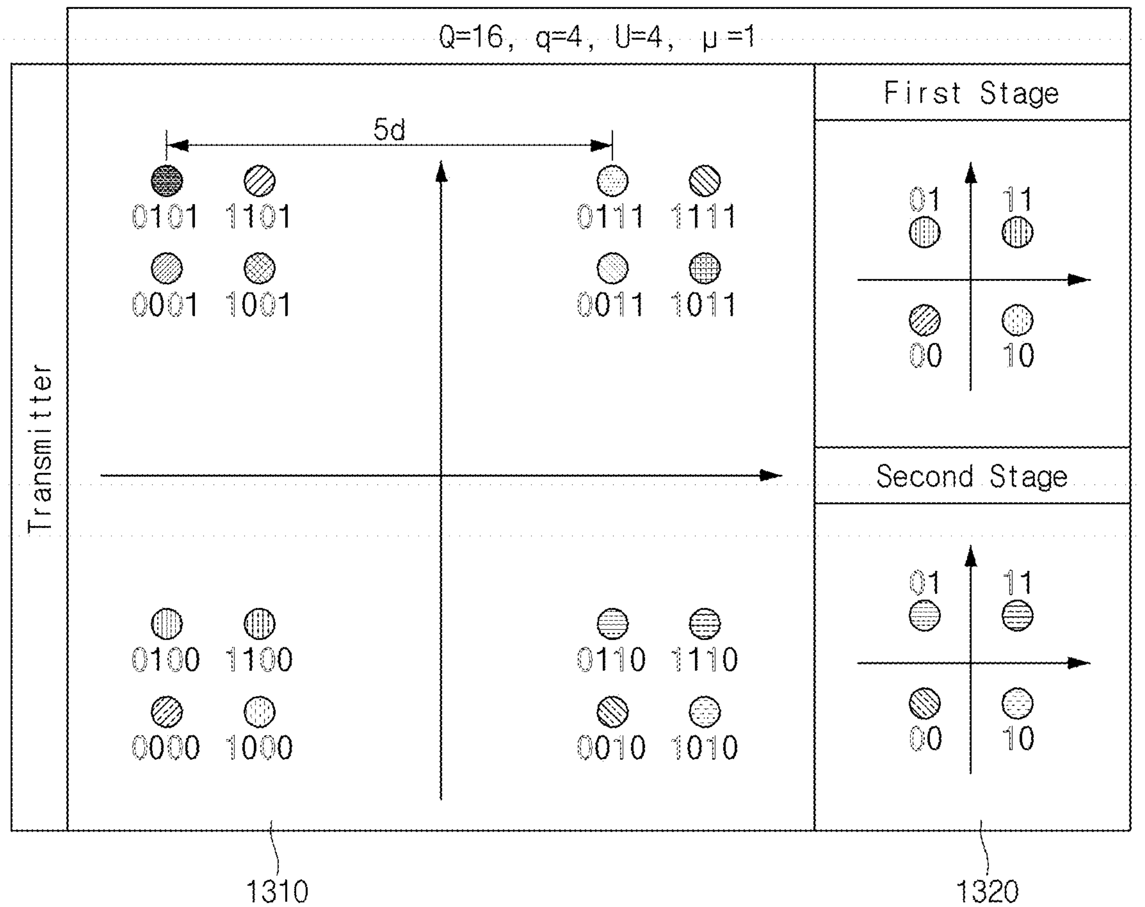
【FIG. 14】
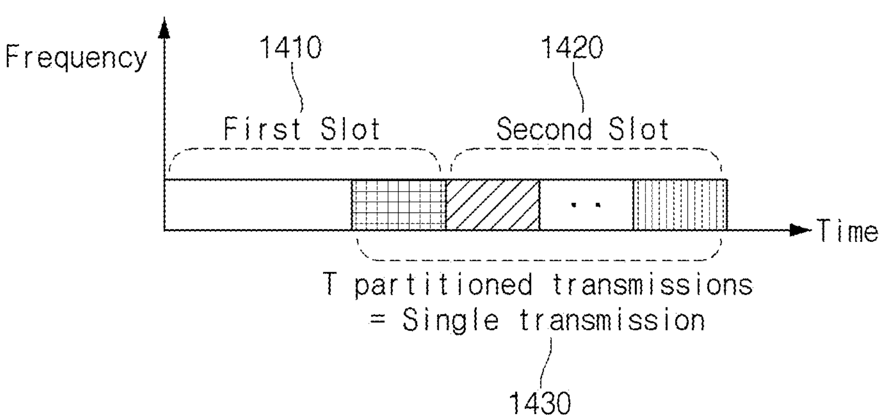

【FIG. 15】
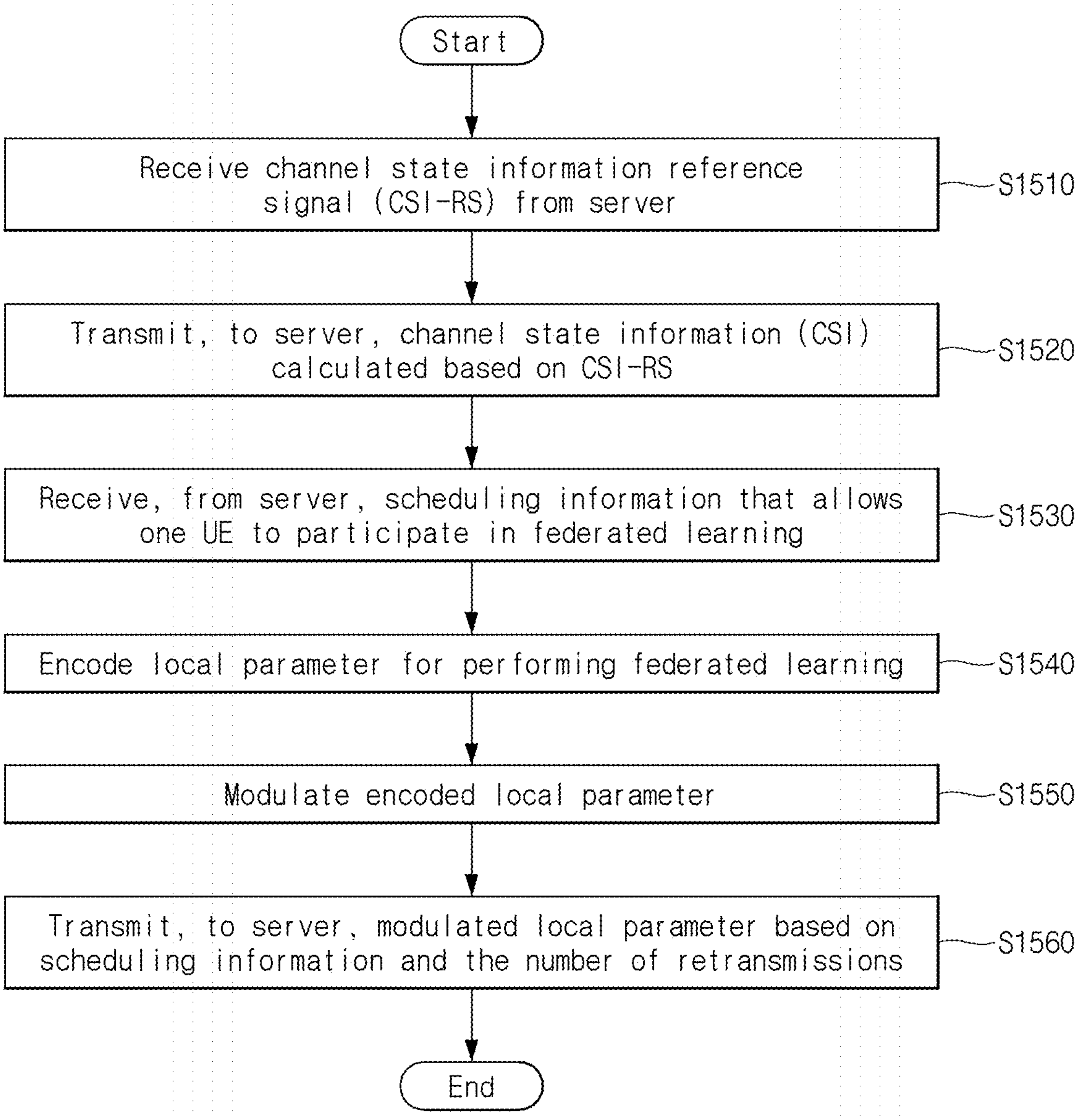

【FIG. 16】
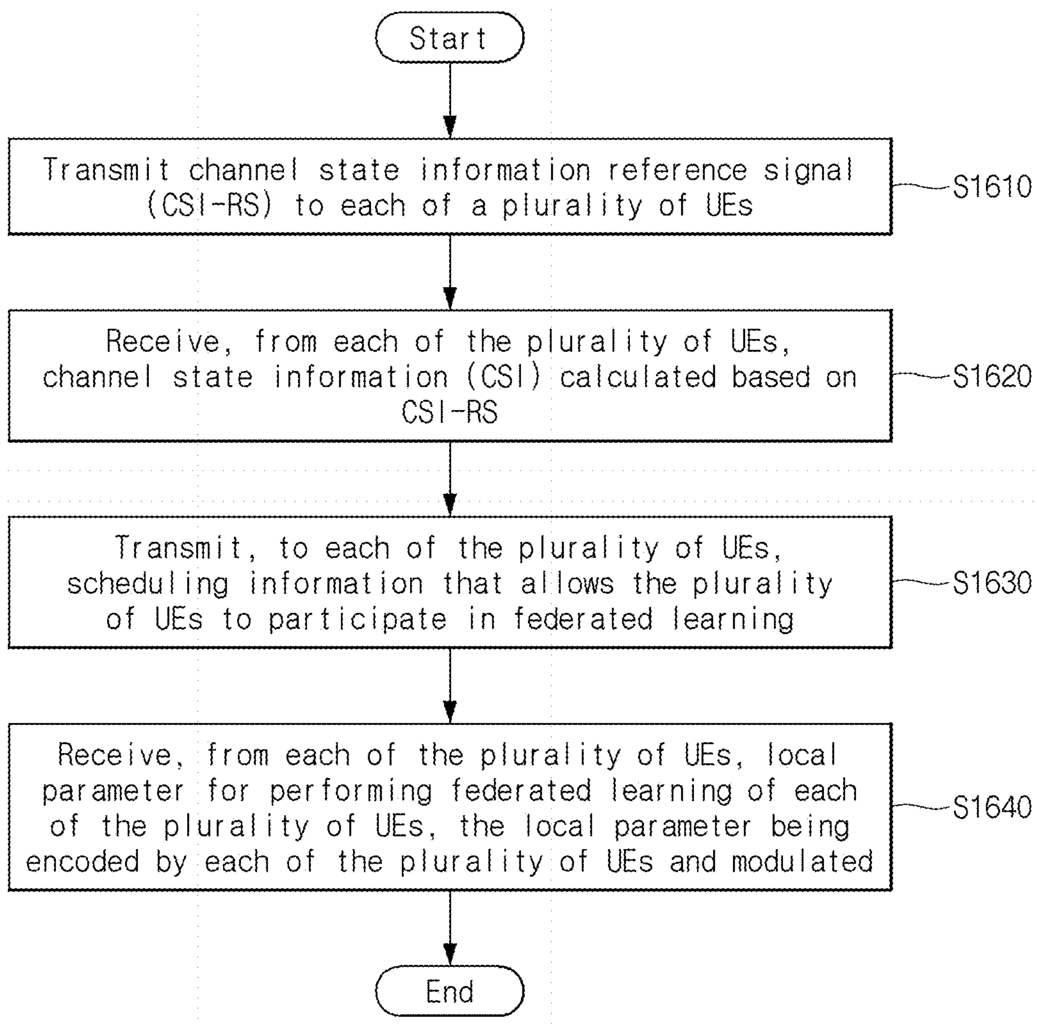

【FIG. 17】
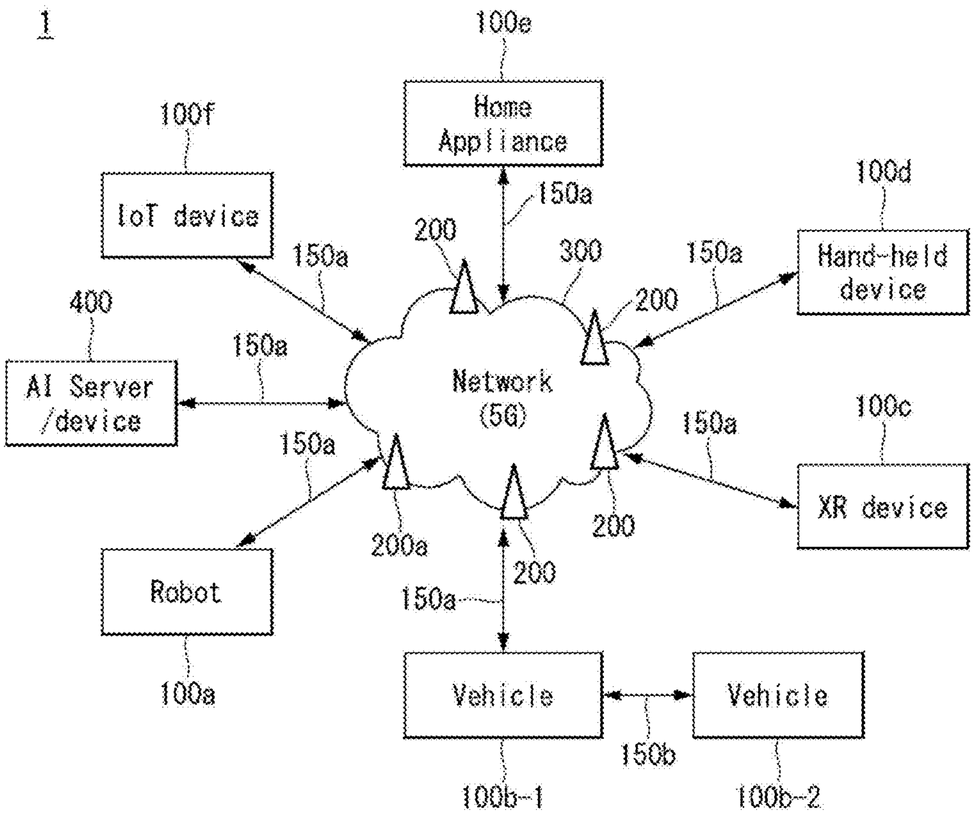
【FIG. 18】
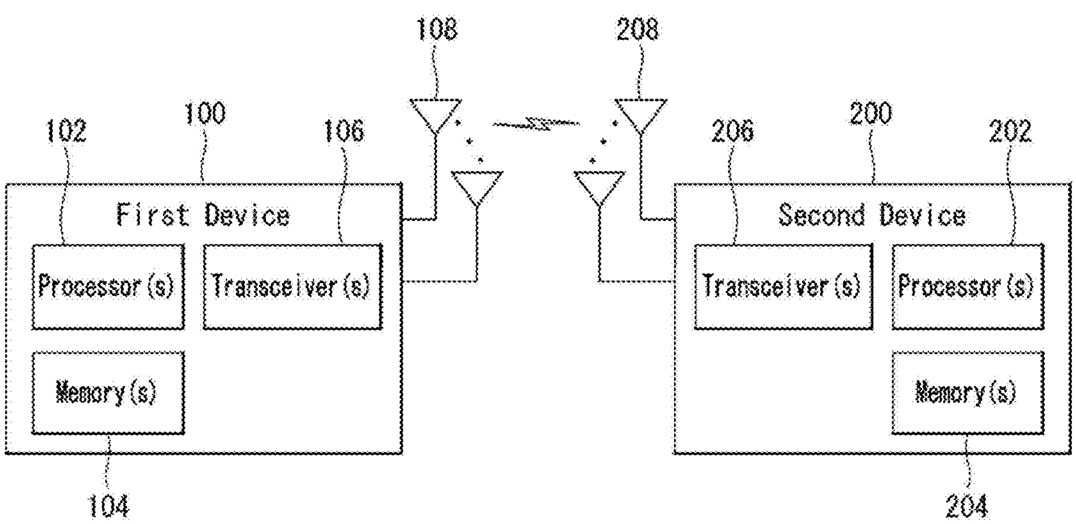

【FIG. 19】
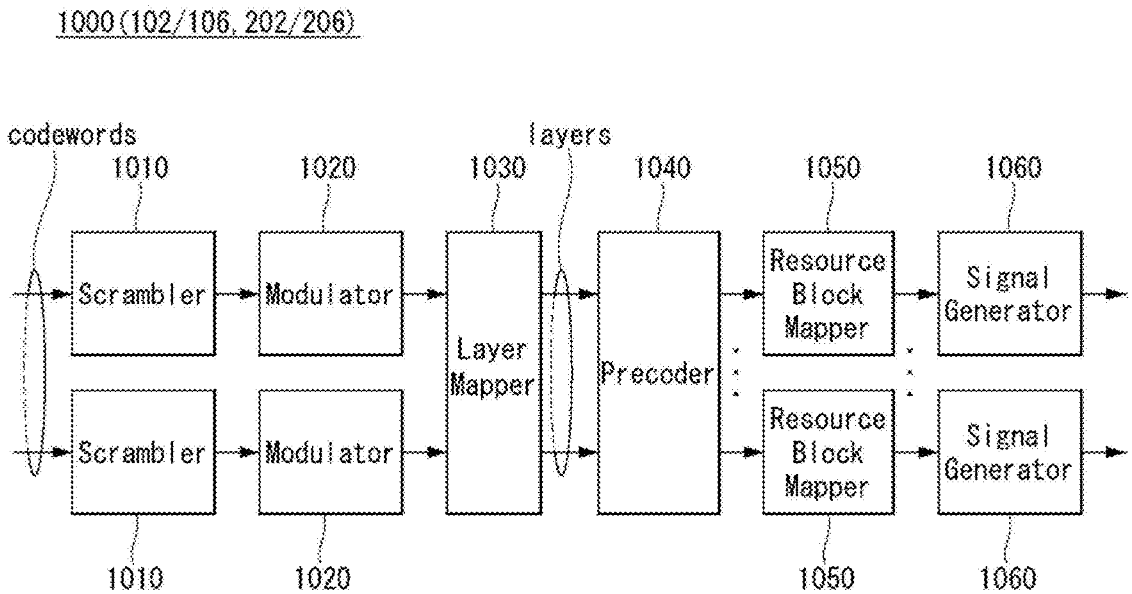
【FIG. 20】
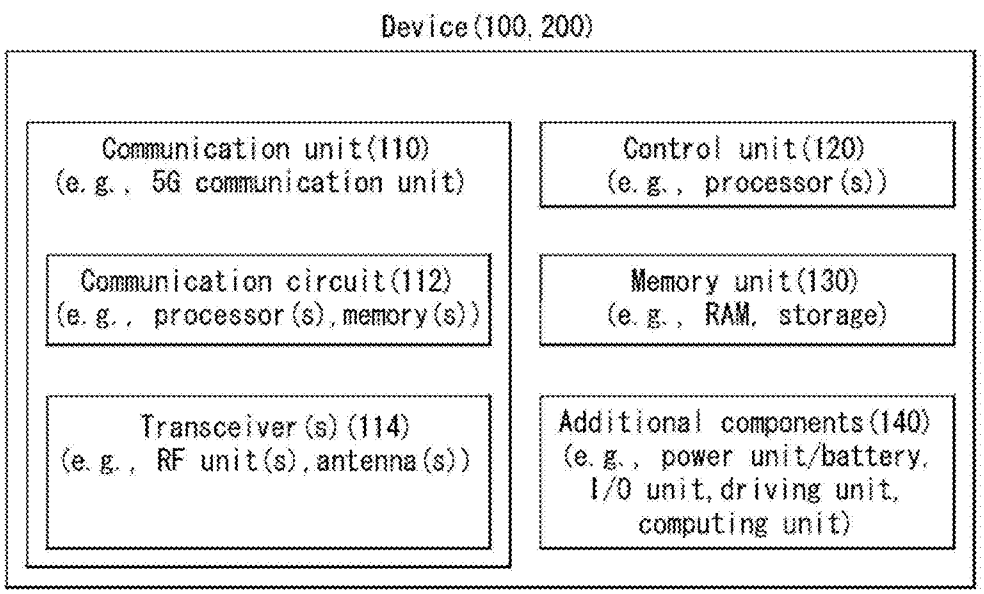

【FIG. 21】
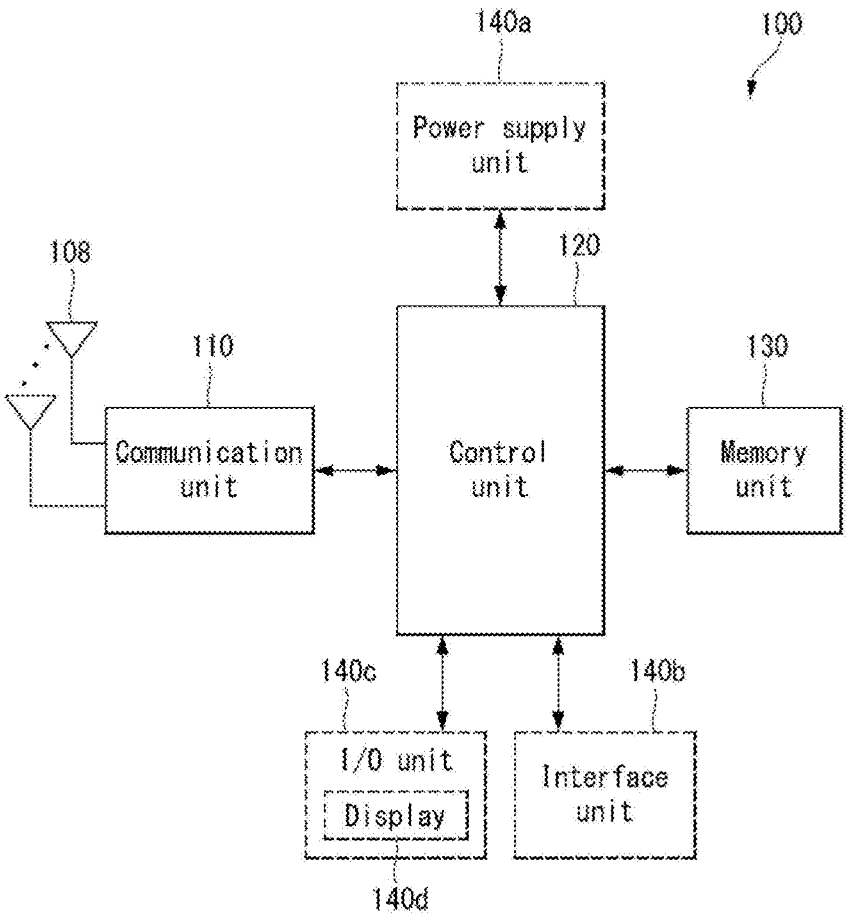

【FIG. 22】
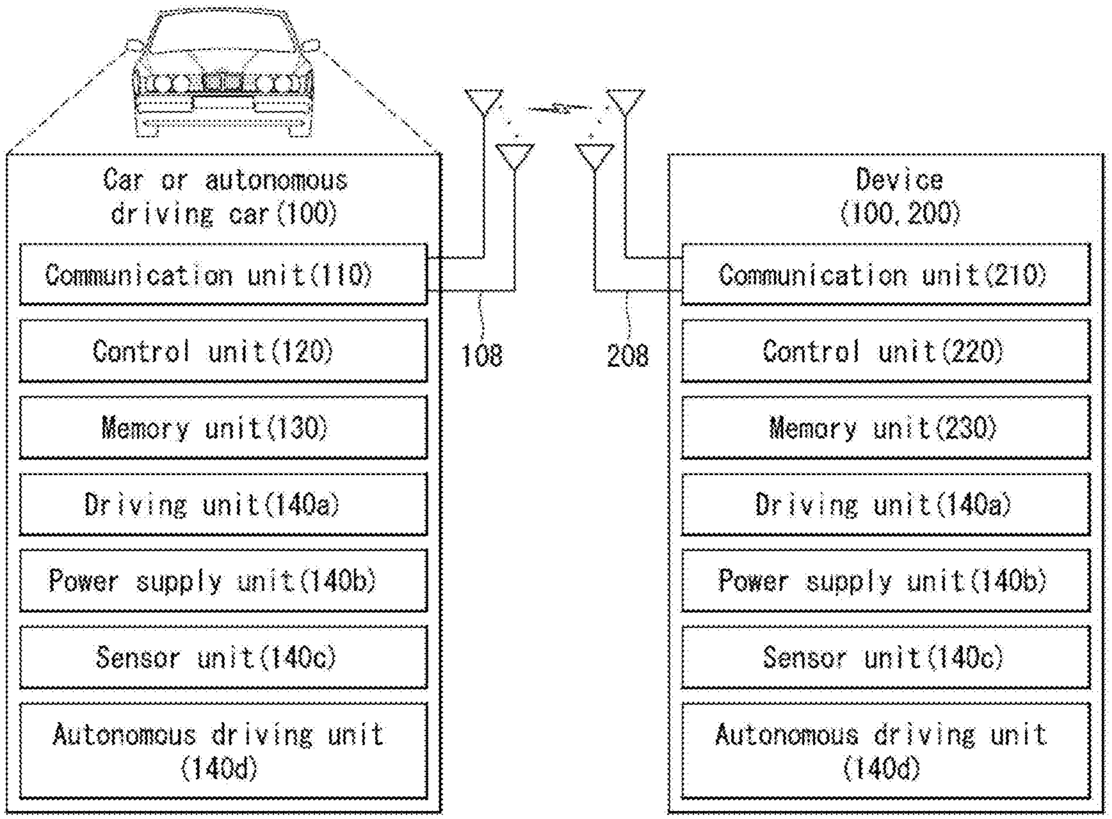
【FIG. 23】
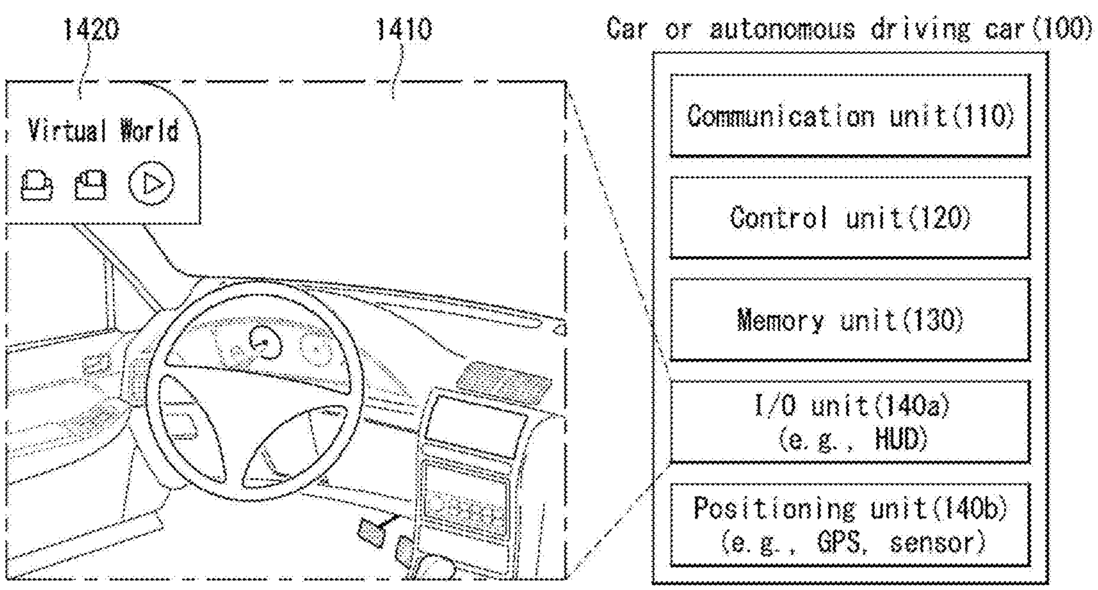

【FIG. 24】
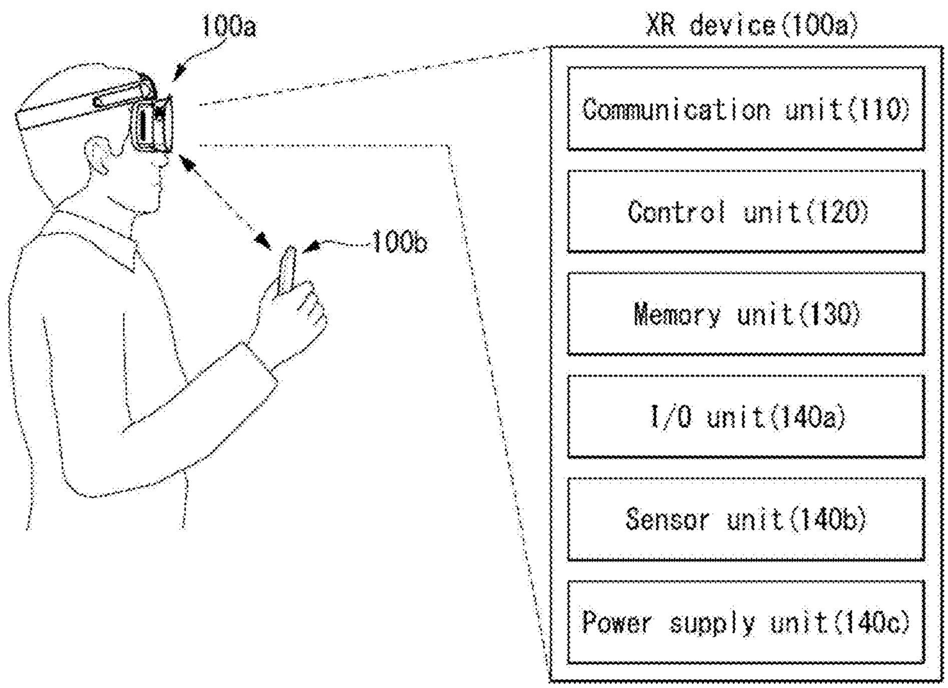
【FIG. 25】
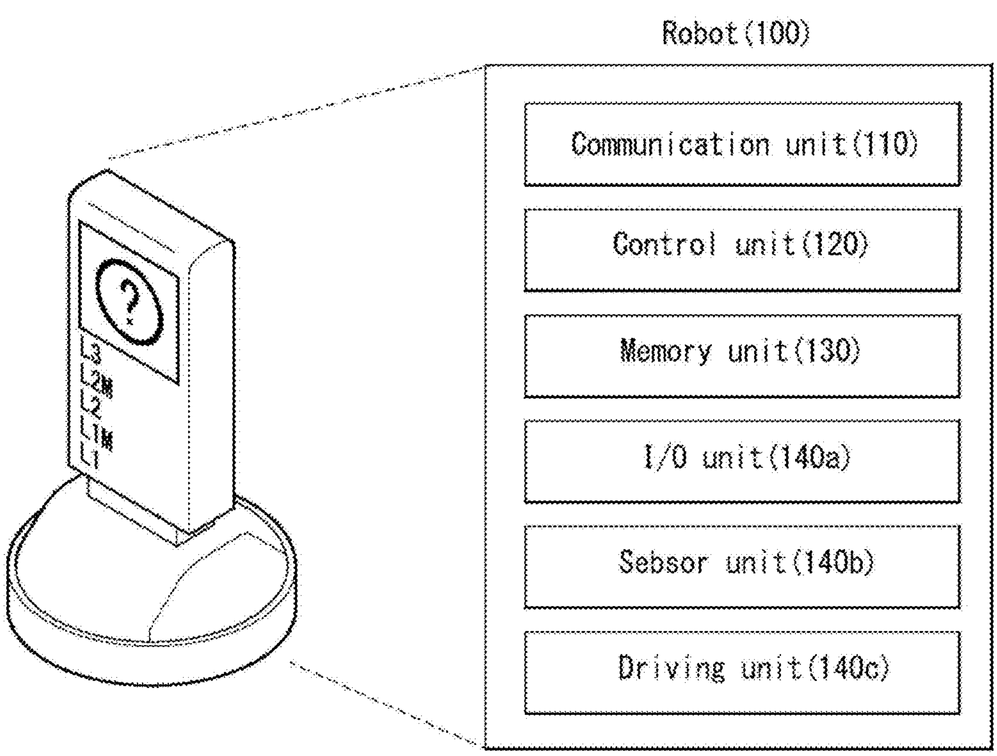

【FIG. 26】
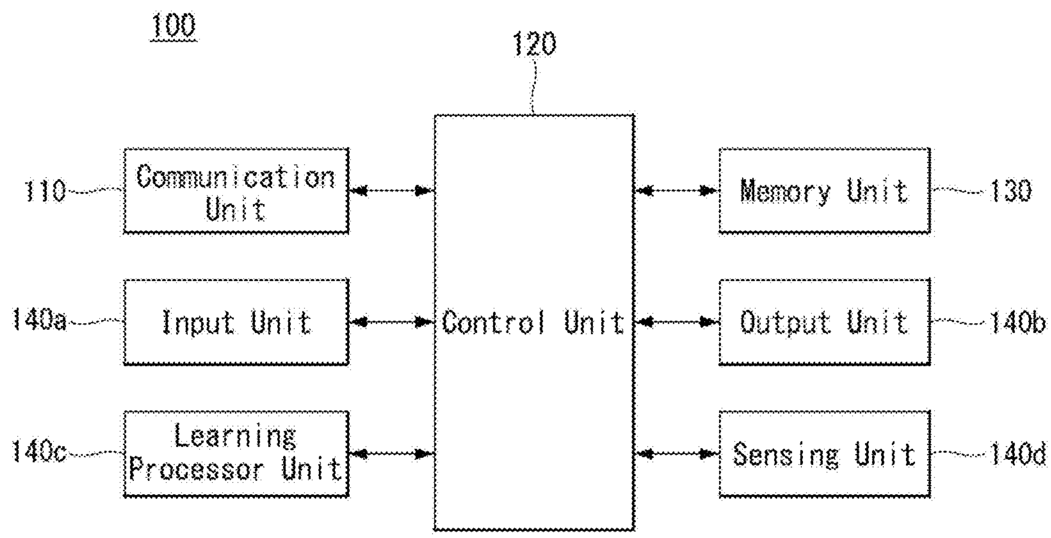

METHOD FOR PERFORMING FEDERATED LEARNING IN WIRELESS COMMUNICATION SYSTEM, AND APPARATUS THEREFOR

CROSS-REFERENCE TO RELATED APPLICATION(S)

This application is the National Stage filing under 35 U.S.C. 371 of International Application No. PCT/KR2022/017362, filed on Nov. 7, 2022, which claims the benefit of earlier filing date and right of priority to Korean Application No. 10-2021-0164721, filed on Nov. 25, 2021, the contents of which are all hereby incorporated by reference herein in their entireties.

TECHNICAL FIELD

The present disclosure relates to a method of performing federated learning, and more particularly to a method for a plurality of user equipments (UEs) to perform federated learning in a wireless communication system and a device therefor.

BACKGROUND ART

Wireless communication systems have been widely deployed to provide various types of communication services such as voice or data. In general, the wireless communication system is a multiple access system capable of supporting communication with multiple users by sharing available system resources (bandwidth, transmission power, etc.). Examples of multiple access systems include a Code Division Multiple Access (CDMA) system, a Frequency Division Multiple Access (FDMA) system, a Time Division Multiple Access (TDMA) system, a Space Division Multiple Access (SDMA) system, an Orthogonal Frequency Division Multiple Access (OFDMA) system, a Single Carrier Frequency Division Multiple Access (SC-FDMA) system, and an Interleave Division Multiple Access (IDMA) system.

DISCLOSURE

Technical Problem

An object of the present disclosure is to provide a method of performing federated learning in a wireless communication system and a device therefor.

Another object of the present disclosure is to provide a method of scheduling a UE participating in federated learning when performing federated learning in a wireless communication system and a device therefor.

Another object of the present disclosure is to provide a method of transmitting a parity part when performing federated learning in a wireless communication system and a device therefor.

Another object of the present disclosure is to provide a method of processing a reception signal at a server when performing federated learning in a wireless communication system and a device therefor.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

The present disclosure provides a method of performing federated learning in a wireless communication system and a device therefor.

More specifically, in one aspect of the present disclosure, there is provided a method for a plurality of user equipments (UEs) to perform a federated learning in a wireless communication system, the method performed by one UE of the plurality of UEs comprising receiving, from a server, a channel state information reference signal (CSI-RS); transmitting, to the server, channel state information (CSI) calculated based on the CSI-RS; receiving, from the server, scheduling information that allows the one UE to participate in the federated learning, wherein the scheduling information is constructed based on a reference channel state configured based on channel state information of each of channels between the server and the plurality of UEs; encoding a local parameter for performing the federated learning, the encoded local parameter including a systematic part and a parity part; modulating the encoded local parameter, wherein the parity part is modulated based on a number of retransmissions determined based on (i) a modulation order of the systematic part and the parity part and (ii) a maximum number of UEs participating in the federated learning; and transmitting, to the server, the modulated local parameter based on the scheduling information and the number of retransmissions, wherein a transmission power for the local parameter is controlled based on a difference between a channel state of a channel between the one UE and the server and the reference channel state.

The scheduling information may be used to determine whether the one UE participates in the federated learning.

The reference channel state may be a channel state between the server and a UE that allows a channel gain between the server and the UE to be highest among the plurality of UEs.

Whether the one UE participates in the federated learning may be determined based on whether a ratio of a channel gain of a channel between the one UE and the server to a channel gain of the reference channel state is equal to or greater than a specific threshold.

Based on the ratio of the channel gain of the channel between the one UE and the server to the channel gain of the reference channel state being less than the specific threshold, the one UE may not participate in the federated learning.

Based on the ratio of the channel gain of the channel between the one UE and the server to the channel gain of the reference channel state being equal to or greater than the specific threshold, the one UE may participate in the federated learning.

The number of retransmissions (i) may be greater than or equal to 1 and (ii) may be determined to be equal to or less than a value by dividing the maximum number of UEs participating in the federated learning by 2 and rounding up.

Based on a channel gain of the one UE being lowest among respective channel gains of the plurality of UEs participating in the federated learning, an allocation power of the one UE for transmitting the systematic part may be set to a maximum power.

Based on the channel gain of the one UE being greater than a lowest channel gain among the respective channel gains of the plurality of UEs participating in the federated learning, the allocation power of the one UE for transmitting the systematic part may be set to a value by multiplying a value, that is determined based on a ratio of a channel gain of the one UE to a channel gain of the reference channel state, by the maximum power.

The parity part may be divided and transmitted on time/frequency resources as many as the number of retransmissions.

In another aspect of the present disclosure, there is provided a user equipment (UE) performing a federated learning with a plurality of UEs in a wireless communication system, the UE comprising a transmitter configured to transmit a radio signal; a receiver configured to receive the radio signal; at least one processor; and at least one computer memory operably connectable to the at least one processor, wherein the at least one computer memory is configured to store instructions performing operations based on being executed by the at least one processor, wherein the operations comprise receiving, from a server, a channel state information reference signal (CSI-RS); transmitting, to the server, channel state information (CSI) calculated based on the CSI-RS; receiving, from the server, scheduling information that allows the UE to participate in the federated learning, wherein the scheduling information is constructed based on a reference channel state configured based on channel state information of each of channels between the server and the plurality of UEs; encoding a local parameter for performing the federated learning, the encoded local parameter including a systematic part and a parity part; modulating the encoded local parameter, wherein the parity part is modulated based on a number of retransmissions determined based on (i) a modulation order of the systematic part and the parity part and (ii) a number of the plurality of UEs participating in the federated learning; and transmitting, to the server, the modulated local parameter based on the scheduling information and the number of retransmissions, wherein a transmission power for the local parameter is controlled based on a difference between a channel state of a channel between the UE and the server and the reference channel state.

In another aspect of the present disclosure, there is provided a method for a base station to perform a federated learning with a plurality of user equipments (UEs) in a wireless communication system, the method comprising transmitting, to each of the plurality of UEs, a channel state information reference signal (CSI-RS); receiving, from each of the plurality of UEs, channel state information (CSI) calculated based on the CSI-RS; transmitting, to each of the plurality of UEs, scheduling information that allows the plurality of UEs to participate in the federated learning, wherein the scheduling information is constructed based on a reference channel state configured based on channel state information of each of channels between the server and the plurality of UEs; and receiving, from each of the plurality of UEs, a local parameter for performing the federated learning of each of the plurality of UEs, the local parameter being encoded and modulated by each of the plurality of UEs, wherein the encoded local parameter includes a systematic part and a parity part, wherein the parity part is modulated based on a number of retransmissions determined based on (i) a modulation order of the systematic part and the parity part and (ii) a number of the plurality of UEs participating in the federated learning, wherein the local parameter of each of the plurality of UEs is transmitted based on the scheduling information and the number of retransmissions, wherein a transmission power for the local parameter is controlled based on a difference between a channel state of the channels between the plurality of UEs and the server and the reference channel state.

In another aspect of the present disclosure, there is provided a base station performing a federated learning with a plurality of user equipments (UEs) in a wireless communication system, the base station comprising a transmitter configured to transmit a radio signal; a receiver configured to receive the radio signal; at least one processor; and at least one computer memory operably connectable to the at least one processor, wherein the at least one computer memory is configured to store instructions performing operations based on being executed by the at least one processor, wherein the operations comprise transmitting, to each of the plurality of UEs, a channel state information reference signal (CSI-RS); receiving, from each of the plurality of UEs, channel state information (CSI) calculated based on the CSI-RS; transmitting, to each of the plurality of UEs, scheduling information that allows the plurality of UEs to participate in the federated learning, wherein the scheduling information is constructed based on a reference channel state configured based on channel state information of each of channels between the server and the plurality of UEs; and receiving, from each of the plurality of UEs, a local parameter for performing the federated learning of each of the plurality of UEs, the local parameter being encoded and modulated by each of the plurality of UEs, wherein the encoded local parameter includes a systematic part and a parity part, wherein the parity part is modulated based on a number of retransmissions determined based on (i) a modulation order of the systematic part and the parity part and (ii) a number of the plurality of UEs participating in the federated learning, wherein the local parameter of each of the plurality of UEs is transmitted based on the scheduling information and the number of retransmissions, wherein a transmission power for the local parameter is controlled based on a difference between a channel state of the channels between the plurality of UEs and the server and the reference channel state.

In another aspect of the present disclosure, there is provided a non-transitory computer readable medium (CRM) storing one or more instructions, wherein the one or more instructions executable by one or more processors are configured to allow one of a plurality of user equipments (UEs) to receive, from a server, a channel state information reference signal (CSI-RS); transmit, to the server, channel state information (CSI) calculated based on the CSI-RS; receive, from the server, scheduling information that allows the one UE to participate in the federated learning, wherein the scheduling information is constructed based on a reference channel state configured based on channel state information of each of channels between the server and the plurality of UEs; encode a local parameter for performing the federated learning, the encoded local parameter including a systematic part and a parity part; modulate the encoded local parameter, wherein the parity part is modulated based on a number of retransmissions determined based on (i) a modulation order of the systematic part and the parity part and (ii) a number of the plurality of UEs participating in the federated learning; and transmit, to the server, the modulated local parameter based on the scheduling information and the number of retransmissions, wherein a transmission power for the local parameter is controlled based on a difference between a channel state of a channel between the one UE and the server and the reference channel state.

In another aspect of the present disclosure, there is provided a device controlling a user equipment (UE) to perform a positioning in a wireless communication system, the device comprising one or more processors; and one or more memories operably connected to the one or more processors, wherein the one or more memories are configured to store instructions performing operations based on being executed by the one or more processors, wherein the operations comprise receiving, from a server, a channel state information reference signal (CSI-RS); transmitting, to the server, channel state information (CSI) calculated based on the CSI-RS; receiving, from the server, scheduling information that allows the UE to participate in the federated learning, wherein the scheduling information is constructed based on a reference channel state configured based on channel state information of each of channels between the server and a plurality of UEs; encoding a local parameter for performing the federated learning, the encoded local parameter including a systematic part and a parity part; modulating the encoded local parameter, wherein the parity part is modulated based on a number of retransmissions determined based on (i) a modulation order of the systematic part and the parity part and (ii) a number of the plurality of UEs participating in the federated learning; and transmitting, to the server, the modulated local parameter based on the scheduling information and the number of retransmissions, wherein a transmission power for the local parameter is controlled based on a difference between a channel state of a channel between the UE and the server and the reference channel state.

Advantageous Effects

The present disclosure can perform federated learning in a wireless communication system.

The present disclosure can also schedule a UE participating in federated learning when performing federated learning in a wireless communication system.

The present disclosure can also efficiently transmit a parity part when performing federated learning in a wireless communication system.

The present disclosure can also process a reception signal at a server when performing federated learning in a wireless communication system.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and serve to explain technical features of the present disclosure together with the description.

FIG. 1 illustrates an example of physical channels and general signal transmission used for the 3GPP system.

FIG. 2 illustrates an example of a supportable communication structure in the 6G system.

FIG. 3 schematically illustrates an example of a structure of a perceptron.

FIG. 4 schematically illustrates an example of a structure of a multilayer perceptron.

FIG. 5 schematically illustrates an example of a deep neural network.

FIG. 6 schematically illustrates an example of a convolutional neural network.

FIG. 7 schematically illustrates an example of a filter operation in a convolutional neural network.

FIG. 8 schematically illustrates an example of a neural network structure in which a circular loop exists.

FIG. 9 schematically illustrates an example of an operation structure of a recurrent neural network.

FIG. 10 illustrates an example of federated learning performed between a plurality of devices and a server.

FIG. 11 illustrates another example of federated learning performed between a plurality of devices and a server.

FIG. 12 illustrates an example of a process of modifying a parity part of a codeword.

FIG. 13 illustrates a comparison between a modulation symbol in a single transmission and a modulation symbol in two retransmissions.

FIG. 14 illustrates an example of resource allocation based on a resource allocation method described in the present disclosure.

FIG. 15 is a flow chart illustrating an example of a method for a UE to perform federated learning in a wireless communication system described in the present disclosure.

FIG. 16 is a flow chart illustrating an example of a method for a base station (server) to perform federated learning in a wireless communication system described in the present disclosure.

FIG. 17 illustrates a communication system 1 applied to the present disclosure.

FIG. 18 illustrates a wireless device applicable to the present disclosure.

FIG. 19 illustrates a signal processing circuit for a transmission signal.

FIG. 20 illustrates another example of a wireless device applied to the present disclosure.

FIG. 21 illustrates a hand-held device applied to the present disclosure.

FIG. 22 illustrates a vehicle or an autonomous vehicle applied to the present disclosure.

FIG. 23 illustrates a vehicle applied to the present disclosure.

FIG. 24 illustrates an XR device applied to the present disclosure.

FIG. 25 illustrates a robot applied to the present disclosure.

FIG. 26 illustrates an AI device applied to the present disclosure.

MODE FOR INVENTION

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro. 3GPP 6G may be an evolved version of 3GPP NR.

For clarity in the description, the following description will mostly focus on 3GPP communication system (e.g. LTE-A or 5G NR). However, technical features according to an embodiment of the present disclosure will not be limited only to this. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR/6G may be collectively referred to as the 3GPP system. For terms and techniques not specifically described among terms and techniques used in the present disclosure, reference may be made to a wireless communication standard document published before the present disclosure is filed. For example, the following document may be referred to.

3GPP LTE

- 36.211: Physical channels and modulation
- 36.212: Multiplexing and channel coding
- 36.213: Physical layer procedures
- 36.300: Overall description
- 36.331: Radio Resource Control (RRC)

3GPP NR

- 38.211: Physical channels and modulation
- 38.212: Multiplexing and channel coding
- 38.213: Physical layer procedures for control
- 38.214: Physical layer procedures for data
- 38.300: NR and NG-RAN Overall Description
- 38.331: Radio Resource Control (RRC) protocol specification Physical Channel and Frame Structure Physical Channel and General Signal Transmission FIG. 1 illustrates an example of physical channels and general signal transmission used for the 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S11). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S12).

When there is no radio resource first accessing the eNB or for signal transmission, the UE may perform a Random Access Procedure (RACH) to the eNB (S13 to S16). To this end, the UE may transmit a specific sequence to a preamble through a Physical Random Access Channel (PRACH) (S13 and S15) and receive a response message (Random Access Response (RAR) message) for the preamble through the PDCCH and a corresponding PDSCH. In the case of a contention based RACH, a Contention Resolution Procedure may be additionally performed (S16).

The UE that performs the above procedure may then perform PDCCH/PDSCH reception (S17) and Physical Uplink Shared Channel (PUSCH)/Physical Uplink Control Channel (PUCCH) transmission (S18) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

The control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., via the PUSCH and/or PUCCH.

Structure of Uplink and Downlink Channels

Downlink Channel Structure

A base station transmits a related signal to a UE via a downlink channel to be described later, and the UE receives the related signal from the base station via the downlink channel to be described later.

(1) Physical Downlink Shared Channel (PDSCH)

A PDSCH carries downlink data (e.g., DL-shared channel transport block, DL-SCH TB) and is applied with a modulation method such as quadrature phase shift keying (QPSK), 16 quadrature amplitude modulation (QAM), 64 QAM, and 256 QAM. A codeword is generated by encoding TB. The PDSCH may carry multiple codewords. Scrambling and modulation mapping are performed for each codeword, and modulation symbols generated from each codeword are mapped to one or more layers (layer mapping). Each layer is mapped to a resource together with a demodulation reference signal (DMRS) to generate an OFDM symbol signal, and is transmitted through a corresponding antenna port.

(2) Physical Downlink Control Channel (PDCCH)

A PDCCH carries downlink control information (DCI) and is applied with a QPSK modulation method, etc. One PDCCH consists of 1, 2, 4, 8, or 16 control channel elements (CCEs) based on an aggregation level (AL). One CCE consists of 6 resource element groups (REGs). One REG is defined by one OFDM symbol and one (P) RB.

The UE performs decoding (aka, blind decoding) on a set of PDCCH candidates to acquire DCI transmitted via the PDCCH. The set of PDCCH candidates decoded by the UE is defined as a PDCCH search space set. The search space set may be a common search space or a UE-specific search space. The UE may acquire DCI by monitoring PDCCH candidates in one or more search space sets configured by MIB or higher layer signaling.

Uplink Channel Structure

A UE transmits a related signal to a base station via an uplink channel to be described later, and the base station receives the related signal from the UE via the uplink channel to be described later.

(1) Physical Uplink Shared Channel (PUSCH)

A PUSCH carries uplink data (e.g., UL-shared channel transport block, UL-SCH TB) and/or uplink control information (UCI) and is transmitted based on a CP-OFDM (Cyclic Prefix-Orthogonal Frequency Division Multiplexing) waveform, DFT-s-OFDM (Discrete Fourier Transform-spread-Orthogonal Frequency Division Multiplexing) waveform, or the like. When the PUSCH is transmitted based on the DFT-s-OFDM waveform, the UE transmits the PUSCH by applying a transform precoding. For example, if the transform precoding is not possible (e.g., transform precoding is disabled), the UE may transmit the PUSCH based on the CP-OFDM waveform, and if the transform precoding is possible (e.g., transform precoding is enabled), the UE may transmit the PUSCH based on the CP-OFDM waveform or the DFT-s-OFDM waveform. The PUSCH transmission may be dynamically scheduled by an UL grant within DCI, or may be semi-statically scheduled based on high layer (e.g., RRC) signaling (and/or layer 1 (L1) signaling (e.g., PDCCH)) (configured grant). The PUSCH transmission may be performed based on a codebook or a non-codebook.

(2) Physical Uplink Control Channel (PUCCH)

A PUCCH carries uplink control information, HARQ-ACK, and/or scheduling request (SR), and may be divided into multiple PUCCHs based on a PUCCH transmission length.

6G System General

A 6G (wireless communication) system has purposes such as (i) a very high data rate per device, (ii) a very large number of connected devices, (iii) global connectivity, (iv) a very low latency, (v) a reduction in energy consumption of battery-free IoT devices, (vi) ultra-reliable connectivity, and (vii) connected intelligence with machine learning capability. The vision of the 6G system may include four aspects such as intelligent connectivity, deep connectivity, holographic connectivity, and ubiquitous connectivity, and the 6G system may satisfy the requirements shown in Table 1 below. That is, Table 1 shows an example of the requirements of the 6G system.

TABLE 1

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

The 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion, and enhanced data security.

FIG. 2 illustrates an example of a communication structure providable in a 6G system.

The 6G system is expected to have 50 times greater simultaneous wireless communication connectivity than a 5G wireless communication system. URLLC, which is the key feature of 5G, will become more important technology by providing an end-to-end latency less than 1 ms in 6G communication. The 6G system may have much better volumetric spectrum efficiency unlike frequently used domain spectrum efficiency. The 6G system can provide advanced battery technology for energy harvesting and very long battery life, and thus mobile devices may not need to be separately charged in the 6G system. In 6G, new network characteristics may be as follows.

- Satellites integrated network: To provide a global mobile group, 6G will be integrated with satellite. Integration of terrestrial, satellite and public networks into one wireless communication system is critical for 6G.
- Connected intelligence: Unlike the wireless communication systems of previous generations, 6G is innovative and may update wireless evolution from "connected things" to "connected intelligence". AI may be applied in each step (or each signal processing procedure to be described later) of a communication procedure.

Seamless Integration Wireless Information and Energy Transfer

- Ubiquitous super 3D connectivity: Access to networks and core network functions of drone and very low earth orbit satellite will establish super 3D connectivity in 6G ubiquitous.

In the new network characteristics of 6G described above, several general requirements may be as follows.

- Small cell networks: The idea of a small cell network has been introduced to improve received signal quality as a result of throughput, energy efficiency, and spectrum efficiency improvement in a cellular system. As a result, the small cell network is an essential feature for 5G and beyond 5G (5GB) communication systems. Accordingly, the 6G communication system also employs the characteristics of the small cell network.
- Ultra-dense heterogeneous network: Ultra-dense heterogeneous networks will be another important characteristic of the 6G communication system. A multi-tier network consisting of heterogeneous networks improves overall QoS and reduces costs.
- High-capacity backhaul: Backhaul connectivity is characterized by a high-capacity backhaul network in order to support high-capacity traffic. A high-speed optical fiber and free space optical (FSO) system may be a possible solution for this problem.
- Radar technology integrated with mobile technology: High-precision localization (or location-based service) through communication is one of the functions of the 6G wireless communication system. Accordingly, the radar system will be integrated with the 6G network.
- Softwarization and virtualization: Softwarization and virtualization are two important functions which are the bases of a design process in a 5GB network in order to ensure flexibility, reconfigurability and programmability. Further, billions of devices can be shared on a shared physical infrastructure.

Core implementation technology of 6G System

Artificial Intelligence (AI)

Technology which is most important in the 6G system and will be newly introduced is AI. AI was not involved in the 4G system. The 5G system will support partial or very limited AI. However, the 6G system will support AI for full automation. Advance in machine learning will create a more intelligent network for real-time communication in 6G. When AI is introduced to communication, real-time data transmission can be simplified and improved. AI may determine a method of performing complicated target tasks using countless analysis. That is, AI can increase efficiency and reduce processing delay.

Recently, attempts have been made to integrate AI with a wireless communication system in the application layer or the network layer, and in particular, deep learning has been focused on the wireless resource management and allocation field. However, such studies have been gradually developed to the MAC layer and the physical layer, and in particular, attempts to combine deep learning in the physical layer with wireless transmission are emerging.

AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. The machine learning may also be used for antenna selection, power control, symbol detection, etc. in the MIMO system.

Machine learning refers to a series of operations to train a machine in order to create a machine capable of doing tasks that people cannot do or are difficult for people to do. Machine learning requires data and learning models. In the machine learning, a data learning method may be roughly divided into three methods, that is, supervised learning, unsupervised learning and reinforcement learning.

Neural network learning is to minimize an output error. The neural network learning refers to a process of repeatedly inputting training data to a neural network, calculating an error of an output and a target of the neural network for the training data, backpropagating the error of the neural network from an output layer to an input layer of the neural network for the purpose of reducing the error, and updating a weight of each node of the neural network.

The supervised learning may use training data labeled with a correct answer, and the unsupervised learning may use training data which is not labeled with a correct answer. That is, for example, in supervised learning for data classification, training data may be data in which each training data is labeled with a category. The labeled training data may be input to the neural network, and the error may be calculated by comparing the output (category) of the neural network with the label of the training data. The calculated error is backpropagated in the neural network in the reverse direction (i.e., from the output layer to the input layer), and a connection weight of respective nodes of each layer of the neural network may be updated based on the backpropagation. Change in the updated connection weight of each node may be determined depending on a learning rate. The calculation of the neural network for input data and the backpropagation of the error may construct a learning cycle (epoch). The learning rate may be differently applied based on the number of repetitions of the learning cycle of the neural network. For example, in the early stage of learning of the neural network, efficiency can be increased by allowing the neural network to rapidly ensure a certain level of performance using a high learning rate, and in the late of learning, accuracy can be increased using a low learning rate.

The learning method may vary depending on the feature of data. For example, in order for a reception end to accurately predict data transmitted from a transmission end on a communication system, it is preferable that learning is performed using the supervised learning rather than the unsupervised learning or the reinforcement learning.

The learning model corresponds to the human brain and may be regarded as the most basic linear model. However, a paradigm of machine learning using, as the learning model, a neural network structure with high complexity, such as artificial neural networks, is referred to as deep learning.

Neural network cores used as the learning method may roughly include a deep neural network (DNN) method, a convolutional deep neural network (CNN) method, and a recurrent Boltzmann machine (RNN) method.

The artificial neural network is an example of connecting several perceptrons.

Referring to FIG. 3, when an input vector x=(x1, x2, . . . , xd) is input, each component is multiplied by a weight (W1, W2, . . . , Wd), and all the results are summed. After that, the entire process of applying an activation function σ(•) is called a perceptron. The huge artificial neural network structure may extend the simplified perceptron structure illustrated in FIG. 3 to apply the input vector to different multidimensional perceptrons. For convenience of explanation, an input value or an output value is referred to as a node.

The perceptron structure illustrated in FIG. 6 may be described as consisting of a total of three layers based on the input value and the output value. FIG. 4 illustrates an artificial neural network in which the number of (d+1) dimensional perceptrons between a first layer and a second layer is H, and the number of (H+1) dimensional perceptrons between the second layer and a third layer is K, by way of example.

A layer where the input vector is located is called an input layer, a layer where a final output value is located is called an output layer, and all layers located between the input layer and the output layer are called a hidden layer. FIG. 7 illustrates three layers, by way of example. However, since the number of layers of the artificial neural network is counted excluding the input layer, it can be seen as a total of two layers. The artificial neural network is constructed by connecting the perceptrons of a basic block in two-dimension.

The above-described input layer, hidden layer, and output layer can be jointly applied in various artificial neural network structures, such as CNN and RNN to be described later, as well as the multilayer perceptron. The greater the number of hidden layers, the deeper the artificial neural network is, and a machine learning paradigm that uses the sufficiently deep artificial neural network as a learning model is called deep learning. In addition, the artificial neural network used for deep learning is called a deep neural network (DNN).

The deep neural network illustrated in FIG. 8 is a multilayer perceptron consisting of eight hidden layers+eight output layers. The multilayer perceptron structure is expressed as a fully connected neural network. In the fully connected neural network, a connection relationship does not exist between nodes located at the same layer, and a connection relationship exists only between nodes located at adjacent layers. The DNN has a fully connected neural network structure and is composed of a combination of multiple hidden layers and activation functions, so it can be usefully applied to understand correlation characteristics between input and output. The correlation characteristic may mean a joint probability of input and output.

Based on how the plurality of perceptrons are connected to each other, various artificial neural network structures different from the above-described DNN can be formed.

In the DNN, nodes located inside one layer are arranged in a one-dimensional longitudinal direction. However, in FIG. 6, it may be assumed that w nodes horizontally and h nodes vertically are arranged in two dimensions (convolutional neural network structure of FIG. 6). In this case, since in a connection process leading from one input node to the hidden layer, a weight is given for each connection, a total of h×w weights needs to be considered. Since there are h×w nodes in the input layer, a total of h2w2 weights are required between two adjacent layers.

FIG. 6 illustrates an example of a structure of a convolutional neural network.

The convolutional neural network of FIG. 9 has a problem in that the number of weights increases exponentially depending on the number of connections. Therefore, instead of considering the connections of all the nodes between adjacent layers, it is assumed that a small-sized filter exists, and a weighted sum and an activation function calculation are performed on an overlap portion of the filters as illustrated in FIG. 10.

One filter has a weight corresponding to the number as much as its size, and learning of the weight may be performed so that a certain feature on an image can be extracted and output as a factor. In FIG. 10, a filter having a size of 3×3 is applied to the upper leftmost 3×3 area of the input layer, and an output value obtained by performing a weighted sum and an activation function calculation for a corresponding node is stored in z22.

The filter performs the weighted sum and the activation function calculation while moving horizontally and vertically by a predetermined interval when scanning the input layer, and places the output value at a location of a current filter. This calculation method is similar to the convolution operation on images in the field of computer vision. Thus, a deep neural network with this structure is referred to as a convolutional neural network (CNN), and a hidden layer generated as a result of the convolution operation is referred to as a convolutional layer. In addition, a neural network in which a plurality of convolutional layers exists is referred to as a deep convolutional neural network (DCNN).

FIG. 7 illustrates an example of a filter operation of a convolutional neural network.

At the node where a current filter is located at the convolutional layer, the number of weights may be reduced by calculating a weighted sum including only nodes located in an area covered by the filter. Hence, one filter can be used to focus on features for a local area. Accordingly, the CNN can be effectively applied to image data processing in which a physical distance on the 2D area is an important criterion. In the CNN, a plurality of filters may be applied immediately before the convolution layer, and a plurality of output results may be generated through a convolution operation of each filter.

There may be data whose sequence characteristics are important depending on data attributes. A structure, in which a method of inputting one element on the data sequence at each time step considering a length variability and a relationship of the sequence data and inputting an output vector (hidden vector) of a hidden layer output at a specific time step together with a next element on the data sequence is applied to the artificial neural network, is referred to as a recurrent neural network structure.

Referring to FIG. 8, a recurrent neural network (RNN) is a structure in which in a process of inputting elements (x1(t), x2(t), . . . , xd(t)) of any line of sight 't' on a data sequence to a fully connected neural network, hidden vectors (z1(t−1), z2(t−1), . . . , zH(t−1)) are input together at an immediately previous time step (t−1) to apply a weighted sum and an activation function. A reason for transferring the hidden vectors at a next time step is that information within the input vector in previous time steps is considered to be accumulated on the hidden vectors of a current time step.

FIG. 8 illustrates an example of a neural network structure in which a circular loop exists.

Referring to FIG. 8, the recurrent neural network operates in a predetermined order of time with respect to an input data sequence.

Hidden vectors (z1(1), z2(1), . . . , zH(1)) when input vectors (x1(t), x2(t), . . . , xd(t)) at a time step 1 are input to the recurrent neural network, are input together with input vectors (x1(2), x2(2), . . . , xd(2)) at a time step 2 to determine vectors (z1(2), z2(2), . . . , zH(2)) of a hidden layer through a weighted sum and an activation function. This process is repeatedly performed at time steps 2, 3, . . . , T.

FIG. 9 illustrates an example of an operation structure of a recurrent neural network.

When a plurality of hidden layers are disposed in the recurrent neural network, this is referred to as a deep recurrent neural network (DRNN). The recurrent neural network is designed to be usefully applied to sequence data (e.g., natural language processing).

A neural network core used as a learning method includes various deep learning methods such as a restricted Boltzmann machine (RBM), a deep belief network (DBN), and a deep Q-network, in addition to the DNN, the CNN, and the RNN, and may be applied to fields such as computer vision, speech recognition, natural language processing, and voice/signal processing.

Federated Learning

In federated learning which is a scheme of distributed machine learning, each of a plurality of devices that are the subjects of learning shares local model parameters with a server, and the server collects the local model parameters of each device and updates a global parameter. The local model parameters may include parameters such as weight and gradient of a local model, and it is obvious that the local model parameters can be expressed in various ways within the range in which they can be interpreted identically/similarly to local parameters, etc. If federated learning is applied to 5G communication or 6G communication, the device may be a user equipment (UE), and the server may be a base station (BS). Hereinafter, the UE/device/transmitter and the server/base station/receiver may be used interchangeably for convenience of explanation.

In the above process, each device does not share raw data with the server, thereby reducing communication overhead during a data transmission process and protecting personal information of the device (user).

FIG. 10 illustrates an example of federated learning performed between a plurality of devices and a server.

More specifically, FIG. 10 illustrates a working process of orthogonal division access based federated learning.

Devices 1011, 1012 and 1013 transmit their local parameters to a server 1020 on resources allocated to each of the devices 1011, 1012 and 1013 (1010). In this instance, before the devices 1011, 1012 and 1013 transmit the local parameters, the devices 1011, 1012 and 1013 may receive configuration information on learning parameters for federated learning from the server 1020. The configuration information on the learning parameters for federated learning may include parameters such as weight and gradient of local models, and the learning parameters included in the local parameters transmitted by the devices 1011, 1012 and 1013 may be determined based on the configuration information. After the reception of the configuration information, the devices 1011, 1012 and 1013 may receive control information for resource allocation for transmission of the local parameters. Each of the devices 1011, 1012 and 1013 may transmit the local parameters on resources allocated based on the control information.

Afterwards, the server 1020 performs offline aggregation (1021 and 1022) on the local parameters received from each of the devices 1011, 1012 and 1013.

In general, the server 1020 derives a global parameter through averaging of all the local parameters received from the devices 1011, 1012 and 1013 participating in federated learning, and transmits the derived global parameter to each of the devices 1011, 1012 and 1013.

However, in the working process of the orthogonal division access based federated learning, overhead generated in terms of the use of radio resources is very large (i.e., radio resources are linearly required as many as the number of devices participating in learning). Further, in the working process of the orthogonal division access based federated learning on limited resources, as the number of devices participating in federated learning increases, there may be a problem that the time required to update the global parameter is delayed (increased).

FIG. 11 illustrates another example of federated learning performed between a plurality of devices and a server.

More specifically, FIG. 11 illustrates a working process of Over-the-Air (OTA) computation based federated learning. The OTA computation may be briefly referred to as Aircomp.

The Aircomp based federated learning is a method in which all devices participating in federated learning each transmit their local parameters on the same resources. Hence, the Aircomp based federated learning can solve the problem, described above with reference to FIG. 10, that the time required to update the global parameter is delayed as the number of devices participating in learning increases.

In FIG. 11, devices 1111, 1112 and 1113 transmit their local parameters to a server 1120 on equally allocated resources (1110). In this instance, before the devices 1111, 1112 and 1113 transmit the local parameters, the operations (configuration information reception and control information reception) performed before transmission of the local parameters described in FIG. 10 may be performed in the same manner in FIG. 11.

The local parameters transmitted by the devices 1111, 1112 and 1113 are transmitted based on an analog method or a digital method. The analog method means that pulse amplitude modulation (PAM) is simply applied to a gradient value, and the digital method means that quadrature amplitude modulation (QAM) or phase shift keying (PSK), which is a typical digital modulation method, is applied to a gradient value. The server 1120 may obtain a sum of the local parameters transmitted based on the analog or digital method received by superposition on air (1121). Afterwards, the server 1120 derives a global parameter through averaging of all the local parameters and transmits the derived global parameter to each of the devices 1111, 1112 and 1113.

In the AirComp based federated learning, because devices participating in the federated learning each transmit local parameters on the same resources, the number of devices participating in learning does not significantly affect latency. That is, even if the number of devices participating in the federated learning increases, the time it takes to update the global parameter does not change significantly compared to when a small number of devices participate in the federated learning. Therefore, the AirComp based federated learning can be efficient in terms of radio resource management.

In general, in the AirComp method, it is difficult to obtain an error correction performance gain by using the existing transmission/reception chain and binary channel coding. As a solution to this, a restriction-based scalable Q-ary code method for the AirComp method has been proposed. Based on Q being a prime number or $q^2$ case and power of 2 ($2^q$) case, different ways of information restrictions and modulations are applied. A biggest difference between the two cases is that the degree of freedom of available channel (channel dof) in the modulation is 2, but the degree of freedom of a transmitted symbol is greater or less than dof (the number of components of a polynomial) of 2. In the former case, modulation is possible without much consideration of the accumulations as many as the number of users/UEs. On the other hand, in the latter case ($Q=2^q$), when multiple components are projected on one channel, an amplitude modulation for each component shall be performed considering accumulations as many as the number of users. For example, if $Q=2^4$, a set of degree-3 polynomials becomes a symbol set $$\left(\mathbb{S} = \left\{p(z) = \sum_{i=I}^{4} a_i z^{i-1} | a_i \in \{0, 1\}\right\}\right).$$

Here, if $(a_1, a_3)$ is mapped to a real channel by the amplitude modulation, the modulation shall be performed taking into account that it can be accumulated as many as the number of users participating in AirComp. Assuming that four users participate in learning, if modulation of amplitude 1 has been performed on $a_1$, ambiguity can be removed when modulation of at least amplitude 5 is performed on $a_3$. That is, as the number of users increases, when the same power is assumed in symbol mapping of a parity part, a distance between contiguous symbols exponentially decreases. Therefore, repetition transmission of the parity part that is a retransmission method for AirComp may not be efficient for the case of $Q=2^q$. The present disclosure proposes a retransmission method suitable for the case of $Q=2^q$.

Before describing a method proposed in the present disclosure, notations used in the present disclosure are defined as below.

Notations: regular characters represent a scalar, bold lowercase and uppercase characters represent a vector and a matrix, and calligraphic characters represent a set. For example, x, x, X and $\mathbb{X}$ denote a scalar, a vector, a matrix and a set. x[i] denotes an i-th entry of vector x, and $$[x[i]]_{i=m}^{n} = [x[m], x[m+1], \ldots, x[n]].\lceil\cdot\rceil, \lfloor\cdot\rfloor$$

and $(\bullet)_q$ denote ceiling, flooring and modulo-q operation. |x| and |x| (or $|\mathbb{X}|$) denote an absolute value of x and cardinality of x (or $\mathbb{X}$), and $|\bullet|_2$ denotes $l_2$-norm.

The following describes a retransmission method in the case of $Q=2^q$ that can be properly applied in restriction-based scalable Q-ary code based AirComp and restriction-based scalable Q-ary linear code based AirComp. A method proposed in the present disclosure considers the following three characteristics generated based on an information restriction.

1. A systematic part and a parity part generate different Q-ary sequences as a codeword due to the information restriction. Generating different Q-ary codewords means that it can be modulated and transmitted with different modulation orders.
2. The systematic part can use a low-order modulation and use polynomial components orthogonally for each user due to restrictions. Hence, accumulation as many as the number of users in the modulation may not be considered. On the other hand, the parity part requires a high-order modulation to map a codeword symbol to a single modulated symbol, and it should be taken into account that it can be accumulated as many as the number of users.

3. The systematic part can achieve the same reception sensitivity by utilizing relatively much lower power than the parity part. Therefore, it is efficient for systematic part to achieve the target reception sensitivity through a single transmission, and the parity part to achieve the target reception sensitivity by utilizing multiple transmissions. In this instance, rather than the simple repetition transmission, it may be more efficient in terms of power consumption to modulate and transmit the codeword symbol of the parity part with respect to a partial polynomial component.

The codeword and the modulation method in restriction-based Q-ary linear code are described below.

Information Restriction

A set of all devices participating in federated learning is defined as $\mathbb{U}=\{1, \ldots, U\}$, and a finite field to perform non-binary coding is defined as $\mathbb{F}_{q_q}$. In this instance, q is assumed to be equal to or greater than at least U. An information sequence with length qK of each user-u is defined as $$I_u^b = [i_u^b[k]]_{k=1}^{qK},$$

and an information freedom is defined as $\mu \in \{1, \ldots, q/U\}$. This means the degree to which information can be carried in a partial sequence with length q of each user-u, and zero padding is performed on remaining sequences q−μ. And, $$I_u^b$$

may be expressed as in Equation 1 below.

$$I_u^b = [I_{u,k}^b]_{k=1}^{K} \text{ where } I_{u,k}^b \in \sigma(\mathbb{B}_{q,\mu}, (u+k+1)_U) \text{ and } \mathbb{B}_{q,\mu} = \{[d2b(l, \mu), 0_{q-\mu}]\}_{l=0}^{2^\mu-1} \quad \text{[Equation 1]}$$

Here, d2b(l, μ) is a function that converts a non-negative decimal integer l into a binary vector of length μ, and $\sigma(\mathbb{A}, a)$ denotes a set that right cyclic-shifts respective elementary vectors of a set $\mathbb{A}$ by a. Further, a reason for converting an information sequence set in units of partial sequence with length q for each user (i.e., adjusting a location where information is carried) is to set the average power for each user to be the same.

Encoder

The binary sequence $$I_u^b$$

above represented as Q-ary symbol sequence is defined as $I_u$. A parity check matrix defined in the finite field $\mathbb{F}_Q$ is defined as $H \in \mathbb{Z}_Q^{M\times N}$ (M=N−K). The binary representation of the H is defined as $H^b \in \{0,1\}^{qM\times qN}$, and a generator matrix for this is defined as $G^b=[I_k, P](\in \{0,1\}^{qK\times qN})$. A codeword through encoding of each user-u is $$c_u^b = (G^b)^T I_u^b,$$

and a systematic codeword is $$[c_c^b[k]]_{k=1}^{qK} = I_u^b.$$

The codeword is defined as Q-ary symbol sequence $c_u$.

Modulation [Systematic Part]

The modulation order is determined by the number U of users participating in federated learning and an information freedom μ. In terms of units of partial sequence with length q, a portion q−μU of a rear end of a systematic sequence is always zero-padded and is not used. Therefore, a systematic part where modulation is performed in the codeword considering this is defined as $$c_u^{sys,b} \cdot c_u^{sys,b}$$

is defined as in Equation 2 below.

$$c_u^{sys,b} = \begin{cases} [c_u^b[k]]_{k=1}^{qK}, & \text{if } q = \mu U, \\ [c_u^b[q(k-1)+l]]_{l=1,k=1}^{\mu U,K}, & \text{else.} \end{cases} \quad \text{[Equation 2]}$$

When a receiver observes aggregated modulated symbols, an effective modulation order is $2^{\mu U}$, but the modulation order at each transmitter is $U(2^\mu-1)+1$. For example, if q=6, μ=2, and U=3, $2^{\mu U}$ symbols corresponding to 000000 to 111111 are observed at the receiver. Therefore, the modulation order is $2^{\mu U}$.

Because a transmitter modulates and transmits symbols for 000000, 100000, 010000, 110000, 001000, 000100, 001100, 000010, 000001, and 000011, the modulation order is $U(2^\mu-1)+1$. Here, the important point is that there should be no ambiguity between the respective symbols when observed by the receiver. The modulation method considering this is as shown in Equation 3 below.

$$s_u[k] = \mathcal{M}_{\mu U}^{sys}\left(c_u^{sys,b}[\mu U(k-1)+1:\mu Uk]\right) = \sum_{l\in\mathbb{N}_{odd}^{\mu U}} 2^{\lceil l/2\rceil-1} c_u^{sys,b}[\mu U(k-1)+l] + j\left(\sum_{l\in\mathbb{N}_{even}^{\mu U}} 2^{\lceil l/2\rceil-1} c_u^{sys,b}[\mu U(k-1)+l]\right) - b \quad \text{[Equation 3]}$$

Here, b denotes offset-term and can be set appropriately depending on each purpose. For example, the offset-term may be set in terms of optimization of power consumption at the transmitter or optimization of the received signal range at the receiver. More specifically, the offset-term may be defined as in Equation 4 below when the purpose is that constellation is observed symmetrically in each I-channel and Q-channel for optimization of the received signal range at the receiver.

$$b = \left(\sum_{l \in \mathbb{N}_{odd}^{\mu U}} 2^{\lceil l/2 \rceil - 1} + j \sum_{l \in \mathbb{N}_{even}^{\mu U}} 2^{\lceil l/2 \rceil - 1}\right) / 2U \quad \text{[Equation 4]}$$

The modulation of the parity part is described below.

Device Scheduling and Reference Channel Gain Setting

A method of scheduling devices to participate in federated learning is described below. A ser of all users and a set of channels are defined as={1, . . . , U} and $\mathbb{h} =$ $$\{h_u^{ch}\}_{u=1}^{\hat{U}}.$$

is assumed that channels $$h_u^{ch}$$

between device-u and a server are sorted in descending manner $$(|h_i^{ch}|_2 \geq |h_j^{ch}|_2 \text{ for } i < j).$$

If Q is given, the maximum number of users is set to U=q, and U devices are selected to construct a collection set $\mathbb{U}$={1, . . . , U}. Scheduling of the devices to participate in federated learning among all the U devices is performed using a method shown in Equation 5 below.

$$\mathbb{U}^* = \left\{u \in \mathbb{U} \mid |h_u^{ch}|_2 \geq \eta_{th}, \frac{|h_u^{ch}|_2}{|h_1^{ch}|_2} \geq \eta_{ratio}\right\} \text{ and } h_{ref}^{ch} = |h_{U^*}^{ch}|_2 \quad \text{[Equation 5]}$$

Here, U*=| $\mathbb{U}^*$ |, $\eta_{th}$ denotes a minimum required reception sensitivity, and $\eta_{ratio}$ denotes a channel gain difference ratio and means that devices with a certain channel gain compared to a maximum channel gain participating in learning will be allowed to participate in learning. In this instance, there is a trade-off relationship between a power loss of devices with good channels and a participation rate of devices participating in learning. That is, as the participation rate of devices participating in learning increases, the power loss of devices with good channels may increase.

When this method is applied to a federated learning process, a plurality of UEs participating in federated learning receive a channel state information reference signal (CSI-RS) from a server, transmit channel state information (CSI) calculated based on the CSI-RS to the server, and receive scheduling information, that allows one UE of the plurality of UEs to participate in the federated learning, from the server. In this instance, the scheduling information is constructed based on a reference channel state configured based on channel state information of each of channels between the server and the plurality of UEs.

Further, the scheduling information may be used to determine whether a specific UE participates in the federated learning. The reference channel state may refer to a channel state between the server and a UE that allows a channel gain between the server and the UE to be highest among the plurality of UEs. Whether the specific UE participates in the federated learning may be determined based on whether a ratio of a channel gain of a channel between the specific UE and the server to a channel gain of the reference channel state is equal to or greater than a specific threshold. More specifically, based on the ratio of the channel gain of the channel between the specific UE and the server to the channel gain of the reference channel state being less than the specific threshold, the specific UE may not participate in the federated learning. In addition, based on the ratio of the channel gain of the channel between the specific UE and the server to the channel gain of the reference channel state being equal to or greater than the specific threshold, the specific UE may participate in the federated learning.

Selection of the Number of Retransmissions (T)

This method relates to a method of selecting the number of retransmissions dedicated to parity bit transmission. In this method, the number of retransmissions T is determined considering an available resource situation. In this instance, T is equal to or less than $\lceil q/2 \rceil$. A reason for determining the number of retransmissions as above is that if T=$\lceil q/2 \rceil$, only one polynomial component information is modulated per channel (real/image) during modulation. Therefore, even if the same power P is used, the parity part is no longer less reliable than the systematic part. T is selected among [1,$\lceil q/2 \rceil$] considering the available resource situation and target reliability.

When this method is applied to the federated learning process, the UE, that is determined to participate in the federated learning through the scheduling of the device to participate in the federated learning described above, encodes a local parameter for performing the federated learning. In this instance, the encoded local parameter includes a systematic part and a parity part. Afterwards, the UE modulates the encoded local parameter, and the parity part is modulated based on the number of retransmissions determined based on (i) modulation order of the systematic part and the parity part and (ii) the maximum number of UEs participating in the federated learning. The UE transmits the modulated local parameter to the server based on the scheduling information and the number of retransmissions.

Power Allocation of Each Device

This method relates to a power allocation method for devices participating in federated learning. The power allocation for systematic part transmission is determined as in Equation 6 below.

$$P_u^{sys} = \begin{cases} \left(\frac{\overline{h}_{ref}^{ch}}{|h_u^{ch}|_2}\right)^2 P, & \text{if } u < U^*, \\ P, & \text{if } u = U^*, \end{cases} \quad \text{[Equation 6]}$$

Among the devices participating in federated learning, a user with the worst channel gain performs transmission using the maximum power P, and remaining users perform the power control so that the remaining users have the same reception sensitivity as a signal transmitted by the user with the worst channel gain, and perform transmission.

In this instance, modulation for a parity part may be performed as below.

$$\left[\text{Case 1: } r_m = \frac{q}{T} \text{ and } \left(\frac{q}{T}\right)_2 = 0\right]$$

$$\text{For } k = 1, \ldots, N-K, \text{ and } t = 1, \ldots, q/r_m,$$

-continued

[Equation 7]

$$s_u[K+(N-K)(t-1)+k] = \mathcal{M}^{par}_{2^{r_m}}\left(c_u^{par,b}\left[q(k-1)+r_m(t-1)+1 : q(k-1)+r_m t\right]\right) = \sum_{l\in\mathbb{N}^{r_m}_{odd}} A_{\lceil \frac{l}{2} \rceil} c_u^{par,b}[q(k-1)+r_m(t-1)+l] + j\left(\sum_{l\in\mathbb{N}^{r_m}_{even}} A_{\lceil l/2 \rceil} c_u^{par,b}[q(k-1)+r_m(t-1)+l]\right) - b$$

$$\left[\text{Case 2: } r_m = \frac{q}{T} \text{ and } \left(\frac{q}{T}\right)_2 > 0\right]$$

$$r_m^1 = \lceil q/T \rceil \text{ and } r_m^2 = q-(T-1)r_m^1,$$

$$\text{for } k = 1, \ldots, N-K, \text{ and } t = 1, \ldots, \lfloor q/r_m^1 \rfloor + 1,$$

[Equation 8]

$$s_u[K+(N-K)(t-1)+k] = \begin{cases} \mathcal{M}^{par}_{2^{r_m^1}}\left(c_u^{par,b}\left[q(k-1)+r_m^1(t-1)+1 : r_m^1 t\right]\right), & \text{if } t \le \lfloor q/r_m^1 \rfloor \\ \mathcal{M}^{par}_{2^{r_m^2}}\left(c_u^{par,b}\left[q(k-1)+r_m^1\left(\left\lfloor \frac{q}{r_m^1} \right\rfloor - 1\right) + 1 : q\right]\right), & \text{else} \end{cases}, = \begin{cases} \sum_{l\in N^{r_m^1}_{odd}} A_{\lceil \frac{l}{2} \rceil} c_u^{par,b}\left[q(k-1)+r_m^1(t-1)+l\right] + j\left(\sum_{l\in^{r_m}_{even}} A_{\lceil 1/2 \rceil} c_u^{par,b}\left[q(k-1)+r_m^1(t-1)+l\right]\right) - b_1, & \text{if } t \le \left\lfloor \frac{q}{r_m^1} \right\rfloor \\ \sum_{l\in N^{r_m^2}_{odd}} A_{\lceil \frac{l}{2} \rceil} c_u^{par,b}\left[q(k-1)+r_m^1\left(\left\lfloor \frac{q}{r_m^1} \right\rfloor - 1\right)+l\right] + j\left(\sum_{l\in N^{r_m^2}_{even}} A_{\lceil 1/2 \rceil} c_u^{par,b}\left[q(k-1)+r_m^1\left(\left\lfloor \frac{q}{r_m^1} \right\rfloor - 1\right)+l\right]\right) - b_2, & \text{else} \end{cases}$$

Here, $A_l$ and $b_1$, $b_2$ denote an amplitude modulation term and offset-terms and can be expressed as in Equations 9 and 10 below, respectively.

[Equation 9]

$$A_l = \sum_{i=1}^{l-1} U^* A_i + 1 \text{ and } A_1 = 1$$

[Equation 10]

$$b_i = \frac{\sum_{l\in\mathbb{N}^{r_m^i}_{odd}} A_{\lceil \frac{l}{2} \rceil} + j\left(\sum_{l\in\mathbb{N}^{r_m^i}_{even}} A_{\lceil \frac{l}{2} \rceil}\right)}{2} \text{ for } i \in \{1, 2\}$$

The power allocation for parity part transmission is determined as in Equation 11 below.

[Equation 11]

$$P_u^{par} = \begin{cases} \left(\frac{\overline{h}^{ch}_{ref}}{|h_u^{ch}|_2}\right)^2 P^{par}_{U^*}, & \text{if } u < U^*, \\ \min\left(\frac{P^{par}_{ave}}{P^{sys}_{ave}} P, P\right), & \text{if } u = U^* \text{ and Case 1}, \\ \min\left(\frac{P^{par,i}_{ave}}{P^{sys}_{ave}} P, P\right), & \text{if } u = U^* \text{ and Case 2}, \end{cases}$$

Here, $$P^{sys}_{ave} \text{ and } P^{par,I}_{ave}$$

denote a constellation average power transmitted in the systematic part and a constellation average power transmitted in the parity part.

When two types of modulation are performed as shown in Equation 8 above, power control is performed by calculating the average power for each modulation type as shown in the third term of Equation 11 above. The power of the user with the worst channel is determined considering the maximum transmission power P and the reception sensitivity of the systematic part. Afterward, the power of the remaining users is controlled using the power of the user with the worst channel as a reference.

FIG. 12 illustrates an example of a process of modifying a parity part of a codeword. More specifically, FIG. 12 illustrates a process of modifying a parity part of a codeword from a high-level concept perspective. It can be seen from FIG. 12 that components included in respective polynomials (1210) of a non-binary parity sequence are modified, and then components corresponding to each other are grouped within the modified sequence (1220).

FIG. 13 illustrates a comparison between a modulation symbol in a single transmission and a modulation symbol in two retransmissions. More specifically, FIG. 13 illustrates an example of Q=16, q=4, U*=4, and μ=1. It can be seen from FIG. 13 that a modulation symbol in a single transmission shall have a minimum distance between contiguous constellations (1310), but for a modulation symbol in two retransmissions, it is not necessary to secure the minimum distance (1320).

Resource Allocation

This method relates to a resource allocation method for devices participating in federated learning. Respective devices participating in federated learning share the same resources and transmit modulated sequences of a systematic part and a parity part to a server. In this instance, the sequence of the parity part is transmitted as a partial modulated sequence using time/frequency resources T times. In this instance, a resource overhead by the transmission of the partial modulated sequence using the time/frequency resources T times is expressed as in Equation 12 below.

[Equation 12]

$$R_{cost} = N + (N-K)(T-1)$$

FIG. 14 illustrates an example of resource allocation based on a resource allocation method described in the present disclosure.

It can be seen from FIG. 14 that partial modulated sequences that are partitioned/divided T times over first and second slots 1410 and 1420 are transmitted T times. This method has an effect of appropriately utilizing time, frequency or time/frequency resources.

Receiver Pre-Processing

This method relates to a pre-processing performed before a receiver obtains a soft-value for channel decoding. An entry of a received signal $$r = [r[n]]_{n=1}^{K+(\lfloor q/r_m^1 \rfloor + 1)(N-K)}$$

for the pre-processing at the receiver can be expressed as in Equation 13 below.

[Equation 13]

$$r[n] = \sum_{u=1}^{U^*} |h_u^{ch}|_2 \sqrt{P_u^{sys}} s_u[n] + w[n]$$

Here, this is additive white Gaussian noise (AWGN) following w[n]~CN(0,1) or N(0,1).

The systematic part and the parity part can be divided as in Equations 14 and 15 below.

[systematic part: n=1, . . . , K]

$$r^{sys}[n] = \sum_{u=1}^{U^*} |h_u^{ch}|_2 \sqrt{P_u^{sys}}\, s_u[n] + w[n] \quad \text{[Equation 14]}$$

[parity part: n=1, . . . , N−K and $$t = 1, \ldots, \lfloor q/r_m^1 \rfloor + 1]$$

$$r_t^{par}[n] = \sum_{u=1}^{U^*} |h_u^{ch}|_2 \sqrt{P_u^{sys}}\, s_u[K + (t-1)(N-K) + n] + w[K + (t-1)(N-K) + n] \quad \text{[Equation 15]}$$

The receiver obtains $$(r_t^{par}[n])$$

soft-value for each n-th component and obtains a soft value of n-th polynomial through summation in log-domain (soft-value of a component corresponding to partition-t of n-th polynomial). Afterwards, the receiver decodes a received signal through a decoding operation.

FIG. 15 illustrates an example where a UE performs a federated learning method described in the present disclosure. More specifically, in a method for a plurality of UEs to perform a federated learning in a wireless communication system, one UE of the plurality of UEs receives a channel state information reference signal (CSI-RS) from a server, in S1510.

Next, the one UE transmits, to the server, channel state information (CSI) calculated based on the CSI-RS, in S1520.

Next, the one UE receives, from the server, scheduling information that allows one UE to participate in the federated learning, in S1530.

The scheduling information is constructed based on a reference channel state configured based on channel state information of each of channels between the server and the plurality of UEs.

Next, the one UE encodes a local parameter for performing the federated learning, in S1540. In this instance, the encoded local parameter includes a systematic part and a parity part.

Next, the one UE modulates the encoded local parameter, in S1550. The parity part is modulated based on the number of retransmissions determined based on (i) modulation order of the systematic part and the parity part and (ii) the maximum number of UEs participating in the federated learning.

Finally, the one UE transmits, to the server, the modulated local parameter based on the scheduling information and the number of retransmissions, in S1560. A transmission power for the local parameter is controlled based on a difference between a channel state of a channel between the one UE and the server and the reference channel state.

FIG. 16 illustrates an example where a base station performs a federated learning method described in the present disclosure. More specifically, a base station performing a federated learning with a plurality of UEs in a wireless communication system transmits a channel state information reference signal (CSI-RS) to each of the plurality of UEs, in S1610.

Next, the base station receives, from each of the plurality of UEs, channel state information (CSI) calculated based on the CSI-RS, in S1620.

Next, the base station transmits, to each of the plurality of UEs, scheduling information that allows the plurality of UEs to participate in the federated learning, in S1630. The scheduling information is constructed based on a reference channel state configured based on channel state information of each of channels between the server and the plurality of UEs.

Next, the base station receives, from each of the plurality of UEs, a local parameter for performing the federated learning of each of the plurality of UEs, the local parameter being encoded and modulated by each of the plurality of UEs, in S1640. The encoded local parameter includes a systematic part and a parity part. The parity part is modulated based on the number of retransmissions determined based on (i) modulation order of the systematic part and the parity part and (ii) the number of the plurality of UEs participating in the federated learning. The local parameter of each of the plurality of UEs is transmitted based on the scheduling information and the number of retransmissions. A transmission power for the local parameter is controlled based on a difference between a channel state of the channels between the plurality of UEs and the server and the reference channel state.

Device Used in Wireless Communication System

Although not limited thereto, various proposals of the present disclosure described above can be applied to various fields requiring wireless communication/connection (e.g., 5G) between devices.

Hereinafter, a description will be given in more detail with reference to the drawings. In the following drawings/description, the same reference numerals may denote the same or corresponding hardware blocks, software blocks, or functional blocks, unless otherwise stated.

FIG. 17 illustrates a communication system applied to the present disclosure.

Referring to FIG. 17, a communication system 1 applied to various embodiments of the present disclosure includes a wireless device, a base station, and a network. The wireless device may refer to a device that performs communication using a wireless access technology (e.g., 5G new RAT (NR) or long term evolution (LTE)) and may be referred to as a communication/wireless/5G device. The wireless device may include a robot 100*a*, vehicles 100*b*-1 and 100*b*-2, an extended Reality (XR) device 100*c*, a hand-held device 100*d*, a home appliance 100*e*, an Internet of Thing (IoT) device 100*f*, and an AI device/server 400, but is not limited thereto. For example, the vehicle may include a vehicle with a wireless communication function, an autonomous vehicle, a vehicle capable of performing inter-vehicle communication, and the like. Further, the vehicle may include an unmanned aerial vehicle (UAV) (e.g., drone). The XR device may include an augmented reality (AR)/virtual reality (VR)/mixed reality (MR) device and may be implemented as a head-mounted device (HMD), a head-up display (HUD) provided in the vehicle, a television, a smart phone, a computer, a wearable device, a home appliance device, digital signage, a vehicle, a robot, etc. The hand-held device may include a smart phone, a smart pad, a wearable device (e.g., a smart watch, a smart glass), a computer (e.g., a notebook, etc.), and the like. The home appliance device may include a TV, a refrigerator, a washing machine, and the like. The IoT device may include a sensor, a smart meter, and the like. For example, the base station and the network may be implemented even as the wireless device, and a specific wireless device 200*a* may operate as a base station/network node for other wireless devices.

FIG. 18 illustrates a wireless device applicable to the present disclosure.

Referring to FIG. 18, a first wireless device 100 and a second wireless device 200 may transmit and receive radio signals through various wireless access technologies (e.g., LTE and NR). {The first wireless device 100 and the second wireless device 200} may correspond to {the wireless device 100*x* and the base station 200} and/or {the wireless device 100*x* and the wireless device 100*x*} of FIG. 17.

The first wireless device 100 may include one or more processors 102 and one or more memories 104 storing various information related to an operation of the one or more processors 102 and may further include one or more transceivers 106 and/or one or more antennas 108. The processor 102 may control the memory 104 and/or the transceiver 106 and may be configured to implement functions, procedures and/or methods described/proposed above.

FIG. 19 illustrates a signal processing circuit for a transmission signal.

Referring to FIG. 19, a signal processing circuit 1000 may include scramblers 1010, modulators 1020, a layer mapper 1030, a precoder 1040, resource mappers 1050, and signal generators 1060. Although not limited to this, an operation/function of FIG. 19 may be performed by the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Further, the blocks 1010 to 1050 may be implemented by the processors 102 and 202 of FIG. 18, and the block 1060 may be implemented by the transceivers 106 and 206 of FIG. 18.

Codewords may be converted into radio signals via the signal processing circuit 1000 of FIG. 19. The codewords are encoded bit sequences of information blocks. The information blocks may include transport blocks (e.g., a UL-SCH transport block, a DL-SCH transport block). The radio signals may be transmitted via various physical channels (e.g., PUSCH, PDSCH, etc.).

Specifically, the codewords may be converted into scrambled bit sequences by the scramblers 1010. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W, where N is the number of antenna ports, and M is the number of transport layers. The precoder 1040 may perform precoding after performing transform precoding (e.g., DFT transform) for complex modulation symbols. Alternatively, the precoder 1040 may perform precoding without performing transform precoding. The resource mappers 1050 may map modulation symbols of each antenna port to time-frequency resources.

Signal processing procedures for a received signal in the wireless device may be configured in a reverse manner of the signal processing procedures 1010 to 1060 of FIG. 19.

FIG. 20 illustrates another example of a wireless device applied to various embodiments of the present disclosure. The wireless device may be implemented in various forms based on use cases/services.

Referring to FIG. 20, wireless devices 100 and 200 may correspond to the wireless devices 100 and 200 of FIG. 19 and may consist of various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the control unit 120 may control an electric/mechanical operation of the wireless device based on programs/codes/instructions/information stored in the memory unit 130. The control unit 120 may transmit the information stored in the memory unit 130 to the exterior (e.g., other communication devices) through the communication unit 110 via a wireless/wired interface or store, in the memory unit 130, information received via the wireless/wired interface from the exterior (e.g., other communication devices) through the communication unit 110.

The additional components 140 may be variously configured based on types of wireless devices. For example, the additional components 140 may include at least one of a power unit/battery, input/output (I/O) unit, a driving unit, and a computing unit. The wireless device may be implemented in the form of the robot (100*a* of FIG. 17), the vehicles (100*b*-1 and 100*b*-2 of FIG. 17), the XR device (100*c* of FIG. 17), the hand-held device (100*d* of FIG. 17), the home appliance (100*e* of FIG. 17), the IoT device (100*f* of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc., but is not limited thereto. The wireless device may be used in a mobile or fixed place based on a use-example/service.

Examples of implementation of FIG. 20 are described in more detail below.

FIG. 21 illustrates a hand-held device applied to the present disclosure.

Referring to FIG. 21, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 20, respectively.

The communication unit 110 may transmit and receive signals (e.g., data and control signals) to and from other wireless devices or BSs. The control unit 120 may perform various operations by controlling components of the hand-held device 100. The control unit 120 may include an application processor (AP). The memory unit 130 may store data/parameters/programs/codes/instructions needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

FIG. 22 illustrates a vehicle or an autonomous vehicle applied to various embodiments of the present disclosure. The vehicle or autonomous vehicle may be implemented by a mobile robot, a car, a train, a manned/unmanned Aerial Vehicle (AV), a ship, etc.

Referring to FIG. 22, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an electronic control unit (ECU). The driving unit 140*a* may allow the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c*, which may include various types of sensors, may obtain a vehicle state, ambient environment information, user information, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

FIG. 23 illustrates a vehicle applied to the present disclosure. The vehicle may be implemented as a transport means, a train, an aerial vehicle, a ship, etc.

Referring to FIG. 23, a vehicle 100 may include a communication unit 110, a control unit 120, a memory unit 130, an I/O unit 140*a*, and a positioning unit 140*b*. The blocks 110 to 130/140*a* and 140*b* correspond to blocks 110 to 130/140 of FIG. 20, respectively.

The communication unit 110 may transmit and receive signals (e.g., data and control signals) to and from external devices such as other vehicles or base stations. The control unit 120 may perform various operations by controlling components of the vehicle 100. The memory unit 130 may store data/parameters/programs/codes/instructions for supporting various functions of the vehicle 100. The I/O unit 140*a* may output an AR/VR object based on information within the memory unit 130. The I/O unit 140*a* may include an HUD. The positioning unit 140*b* may acquire location information of the vehicle 100. The location information may include absolute location information of the vehicle 100, location information of the vehicle 100 within a traveling lane, acceleration information, and location information of the vehicle 100 from a neighboring vehicle. The positioning unit 140*b* may include a GPS and various sensors.

FIG. 24 illustrates an XR device applied to the present disclosure. The XR device may be implemented as an HMD, a head-up display (HUD) mounted in a vehicle, a television, a smartphone, a computer, a wearable device, a home appliance, a digital signage, a vehicle, a robot, etc.

Referring to FIG. 24, an XR device 100*a* may include a communication unit 110, a control unit 120, a memory unit 130, an I/O unit 140*a*, a sensor unit 140*b*, and a power supply unit 140*c*. The blocks 110 to 130/140*a* to 140*c* correspond to the blocks 110 to 130/140 of FIG. 20, respectively.

The communication unit 110 may transmit and receive signals (e.g., media data, control signal, etc.) to and from external devices such as other wireless devices, handheld devices, or media servers. The media data may include video, images, sound, etc. The control unit 120 may control components of the XR device 100*a* to perform various operations. For example, the control unit 120 may be configured to control and/or perform procedures such as video/image acquisition, (video/image) encoding, and metadata generation and processing. The memory unit 120 may store data/parameters/programs/codes/instructions required to drive the XR device 100*a*/generate an XR object. The I/O unit 140*a* may obtain control information, data, etc. from the outside and output the generated XR object. The I/O unit 140*a* may include a camera, a microphone, a user input unit, a display, a speaker, and/or a haptic module. The sensor unit 140*b* may obtain a state, surrounding environment information, user information, etc. of the XR device 100*a*. The sensor 140*b* may include a proximity sensor, an illumination sensor, an acceleration sensor, a magnetic sensor, a gyro sensor, an inertial sensor, an RGB sensor, an IR sensor, a fingerprint scan sensor, an ultrasonic sensor, a light sensor, a microphone, and/or a radar. The power supply unit 140*c* may supply power to the XR device 100*a* and include a wired/wireless charging circuit, a battery, etc.

The XR device 100*a* may be wirelessly connected to the handheld device 100*b* through the communication unit 110, and the operation of the XR device 100*a* may be controlled by the handheld device 100*b*. For example, the handheld device 100*b* may operate as a controller of the XR device 100*a*. To this end, the XR device 100*a* may obtain 3D location information of the handheld device 100*b* and generate and output an XR object corresponding to the handheld device 100*b*.

FIG. 24 illustrates a robot applied to the present disclosure. The robot may be categorized into an industrial robot, a medical robot, a household robot, a military robot, etc., based on a used purpose or field.

Referring to FIG. 24, a robot 100 may include a communication unit 110, a control unit 120, a memory unit 130, an I/O unit 140*a*, a sensor unit 140*b*, and a power supply unit 140*c*. The blocks 110 to 130/140*a* to 140*c* correspond to the blocks 110 to 130/140 of FIG. 20, respectively.

The communication unit 110 may transmit and receive signals (e.g., driving information and control signals) to and from external devices such as other wireless devices, other robots, or control servers. The control unit 120 may perform various operations by controlling components of the robot 100. The memory unit 130 may store data/parameters/programs/codes/instructions for supporting various functions of the robot 100. The I/O unit 140*a* may obtain information from the outside of the robot 100 and output information to the outside of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, etc. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140*c* may perform various physical operations such as movement of robot joints. In addition, the driving unit 140*c* may allow the robot 100 to travel on the road or to fly. The driving unit 140*c* may include an actuator, a motor, a wheel, a brake, a propeller, etc.

FIG. 25 illustrates an AI device applied to the present disclosure. The AI device may be implemented as a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 25, an AI device 100 may include a communication unit 110, a control unit 120, a memory unit 130, an input unit 140*a*, an out unit 140*b*, a learning processor unit 140*c*, and a sensor unit 140*d*. The blocks 110 to 130/140*a* to 140*d* correspond to the blocks 110 to 130/140 of FIG. 20, respectively.

The communication unit 110 may transmit and receive wired/radio signals (e.g., sensor information, user input, learning models, or control signals) to and from external devices such as other AI devices (e.g., 100*x*, 200, or 400 of FIG. 18) or an AI server 200 using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling components of the AI device 100.

The memory unit 130 may store data for supporting various functions of the AI device 100.

The input unit 140*a* may acquire various types of data from the exterior of the AI device 100. The output unit 140*b* may generate output related to a visual, auditory, or tactile sense. The output unit 140*b* may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140*c* may learn a model consisting of artificial neural networks, using learning data. The learning processor unit 140*c* may perform AI processing together with the learning processor unit of the AI server (400 of FIG. 18). The learning processor unit 140*c* may process information received from an external device through the communication unit 110 and/or information stored in the memory unit 130. In addition, an output value of the learning processor unit 140*c* may be transmitted to the external device through the communication unit 110 and may be stored in the memory unit 130.

The embodiments described above are implemented by combinations of components and features of the present disclosure in predetermined forms. Each component or feature should be considered selectively unless specified separately. Each component or feature can be carried out without being combined with another component or feature. Moreover, some components and/or features are combined with each other and can implement embodiments of the present disclosure. The order of operations described in embodiments of the present disclosure can be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the above detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

The present disclosure has described focusing on examples applying to the 3GPP LTE/LTE-A and the 5G system, but can be applied to various wireless communication systems in addition to the 3GPP LTE/LTE-A and the 5G system.

What is claimed is:

1. A method for a plurality of user equipments (UEs) to perform a federated learning in a wireless communication system, the method performed by one UE of the plurality of UEs comprising:

receiving, from a server, a channel state information reference signal (CSI-RS);

transmitting, to the server, channel state information (CSI) calculated based on the CSI-RS;

receiving, from the server, scheduling information that allows the one UE to participate in the federated learning, wherein the scheduling information is constructed based on a reference channel state configured based on channel state information of each of channels between the server and the plurality of UEs;

encoding a local parameter for performing the federated learning, the encoded local parameter including a systematic part and a parity part;

modulating the encoded local parameter, wherein the parity part is modulated based on a number of retransmissions determined based on (i) a modulation order of the systematic part and the parity part and (ii) a maximum number of UEs participating in the federated learning; and transmitting, to the server, the modulated local parameter based on the scheduling information and the number of retransmissions, wherein a transmission power for the local parameter is controlled based on a difference between a channel state of a channel between the one UE and the server and the reference channel state.

2. The method of claim 1, wherein the scheduling information is used to determine whether the one UE participates in the federated learning.

3. The method of claim 2, wherein the reference channel state is a channel state between the server and a UE that allows a channel gain between the server and the UE to be highest among the plurality of UEs.

4. The method of claim 3, wherein whether the one UE participates in the federated learning is determined based on whether a ratio of a channel gain of a channel between the one UE and the server to a channel gain of the reference channel state is equal to or greater than a specific threshold.

5. The method of claim 4, wherein, based on the ratio of the channel gain of the channel between the one UE and the server to the channel gain of the reference channel state being less than the specific threshold, the one UE does not participate in the federated learning.

6. The method of claim 5, wherein, based on the ratio of the channel gain of the channel between the one UE and the server to the channel gain of the reference channel state being equal to or greater than the specific threshold, the one UE participates in the federated learning.

7. The method of claim 1, wherein the number of retransmissions (i) is greater than or equal to 1 and (ii) is determined to be equal to or less than a value by dividing the maximum number of UEs participating in the federated learning by 2 and rounding up.

8. The method of claim 1, wherein, based on a channel gain of the one UE being lowest among respective channel gains of the plurality of UEs participating in the federated learning, an allocation power of the one UE for transmitting the systematic part is set to a maximum power.

9. The method of claim 8, wherein, based on the channel gain of the one UE being greater than a lowest channel gain among the respective channel gains of the plurality of UEs participating in the federated learning, the allocation power of the one UE for transmitting the systematic part is set to a value by multiplying a value, that is determined based on a ratio of a channel gain of the one UE to a channel gain of the reference channel state, by the maximum power.

10. The method of claim 1, wherein the parity part is divided and transmitted on time/frequency resources as many as the number of retransmissions.

11. A user equipment (UE) performing a federated learning with a plurality of UEs in a wireless communication system, the UE comprising:

a transmitter configured to transmit a radio signal;

a receiver configured to receive the radio signal;

at least one processor; and at least one computer memory operably connectable to the at least one processor, wherein the at least one computer memory is configured to store instructions performing operations based on being executed by the at least one processor, wherein the operations comprise:

receiving, from a server, a channel state information reference signal (CSI-RS);

transmitting, to the server, channel state information (CSI) calculated based on the CSI-RS;

receiving, from the server, scheduling information that allows the UE to participate in the federated learning, wherein the scheduling information is constructed based on a reference channel state configured based on channel state information of each of channels between the server and the plurality of UEs;

encoding a local parameter for performing the federated learning, the encoded local parameter including a systematic part and a parity part;

modulating the encoded local parameter, wherein the parity part is modulated based on a number of retransmissions determined based on (i) a modulation order of the systematic part and the parity part and (ii) a number of the plurality of UEs participating in the federated learning; and transmitting, to the server, the modulated local parameter based on the scheduling information and the number of retransmissions, wherein a transmission power for the local parameter is controlled based on a difference between a channel state of a channel between the UE and the server and the reference channel state.

12. A method for a base station to perform a federated learning with a plurality of user equipments (UEs) in a wireless communication system, the method comprising:

transmitting, to each of the plurality of UEs, a channel state information reference signal (CSI-RS);

receiving, from each of the plurality of UEs, channel state information (CSI) calculated based on the CSI-RS;

transmitting, to each of the plurality of UEs, scheduling information that allows the plurality of UEs to participate in the federated learning, wherein the scheduling information is constructed based on a reference channel state configured based on channel state information of each of channels between the server and the plurality of UEs; and receiving, from each of the plurality of UEs, a local parameter for performing the federated learning of each of the plurality of UEs, the local parameter being encoded and modulated by each of the plurality of UEs, wherein the encoded local parameter includes a systematic part and a parity part, wherein the parity part is modulated based on a number of retransmissions determined based on (i) a modulation order of the systematic part and the parity part and (ii) a number of the plurality of UEs participating in the federated learning, wherein the local parameter of each of the plurality of UEs is transmitted based on the scheduling information and the number of retransmissions, wherein a transmission power for the local parameter is controlled based on a difference between a channel state of the channels between the plurality of UEs and the server and the reference channel state.

* * * * *